(12) United States Patent
Fuller et al.

(10) Patent No.: US 9,043,371 B1
(45) Date of Patent: May 26, 2015

(54) STORING INFORMATION IN A TRUSTED ENVIRONMENT FOR USE IN PROCESSING DATA TRIGGERS IN AN UNTRUSTED ENVIRONMENT

(75) Inventors: Alfred R. K. Fuller, San Carlos, CA (US); Mykhailo Aizatskyi, San Francisco, CA (US)

(73) Assignee: GOOGLE INC., Mountain View, CA (US)

(*) Notice: Subject to any disclaimer, the term of this patent is extended or adjusted under 35 U.S.C. 154(b) by 311 days.

(21) Appl. No.: 13/431,912

(22) Filed: Mar. 27, 2012

Related U.S. Application Data

(60) Provisional application No. 61/556,153, filed on Nov. 4, 2011.

(51) Int. Cl.
*G06F 17/30* (2006.01)

(52) U.S. Cl.
CPC .............................. *G06F 17/30371* (2013.01)

(58) Field of Classification Search
CPC ................................................ G06F 17/30371
USPC .......... 707/781, 741, 999.009, 702, 803, 813, 707/816, E17.005
See application file for complete search history.

(56) References Cited

U.S. PATENT DOCUMENTS

| | | | |
|---|---|---|---|
| 4,325,120 A | 4/1982 | Colley et al. | |
| 4,779,194 A | 10/1988 | Jennings et al. | |
| 4,796,178 A | 1/1989 | Jennings et al. | |
| 5,325,522 A | 6/1994 | Vaughn | |
| 5,381,546 A | 1/1995 | Servi et al. | |
| 5,560,007 A | 9/1996 | Thai | |
| 5,745,890 A | 4/1998 | Burrows | |
| 6,105,019 A | 8/2000 | Burrows | |
| 6,108,748 A * | 8/2000 | Ofek et al. | 711/112 |
| 6,269,382 B1 * | 7/2001 | Cabrera et al. | 707/999.202 |
| 6,289,334 B1 | 9/2001 | Reiner et al. | |
| 6,341,302 B1 | 1/2002 | Celis | |
| 6,370,539 B1 | 4/2002 | Ashby et al. | |
| 6,963,869 B2 | 11/2005 | Burrows | |
| 7,043,469 B2 | 5/2006 | Goralwalla et al. | |
| 7,058,949 B1 | 6/2006 | Willen et al. | |

(Continued)

OTHER PUBLICATIONS

PostgreSQL, PostgreSQL 8.1.3 Documentation, Internet Archive Wayback Machine, May 4, 2006, 1 page.

(Continued)

*Primary Examiner* — Phong Nguyen
(74) *Attorney, Agent, or Firm* — Morgan, Lewis & Bockius LLP

(57) ABSTRACT

A server system having memory and one or more processors running a trusted internal process receives, from an untrusted external process of one or more external processes, a request to interact with a data item. In response to the request, the server system interacts with the first data item and stores a marker indicative of the interaction with the data item. After storing the marker, the server system identifies a plurality of markers corresponding to a plurality of data items and retrieves information corresponding to the plurality of markers. The retrieved information enables a determination, for each data item in the plurality of data items, as to whether an operation corresponding to the data item is to be executed. When a determination has been made that an operation corresponding to the data item is to be executed, the server system deletes the markers in conjunction with execution of the operation.

28 Claims, 22 Drawing Sheets

(56) References Cited

U.S. PATENT DOCUMENTS

| | | | |
|---|---|---|---|
| 7,155,716 | B2 | 12/2006 | Hooman et al. |
| 7,243,351 | B2 | 7/2007 | Kundu |
| 7,246,353 | B2 | 7/2007 | Forin et al. |
| 7,406,460 | B2 | 7/2008 | Burrows |
| 7,467,163 | B1 | 12/2008 | Dodds et al. |
| 7,516,456 | B2 | 4/2009 | Aguilar, Jr. et al. |
| 7,689,550 | B2 | 3/2010 | Lee et al. |
| 7,801,864 | B2 * | 9/2010 | Prahlad et al. ............. 707/667 |
| 8,099,422 | B2 | 1/2012 | De Bellis |
| 8,131,680 | B2 * | 3/2012 | Prahlad et al. ............. 707/648 |
| 8,185,899 | B2 | 5/2012 | Daly et al. |
| 8,392,408 | B1 | 3/2013 | Fuller |
| 8,560,509 | B2 | 10/2013 | Xia et al. |
| 8,635,621 | B2 | 1/2014 | Levitan et al. |
| 2003/0088715 | A1 | 5/2003 | Chaudhuri et al. |
| 2003/0140035 | A1 | 7/2003 | Burrows |
| 2004/0167873 | A1 | 8/2004 | Dettinger et al. |
| 2004/0167904 | A1 | 8/2004 | Wen et al. |
| 2004/0243569 | A1 | 12/2004 | Burrows |
| 2005/0055355 | A1 | 3/2005 | Murthy et al. |
| 2005/0228792 | A1 | 10/2005 | Chandrasekaran et al. |
| 2006/0028488 | A1 | 2/2006 | Gabay et al. |
| 2006/0031811 | A1 | 2/2006 | Ernst et al. |
| 2006/0235730 | A1 * | 10/2006 | Politano et al. ............. 705/4 |
| 2006/0235731 | A1 * | 10/2006 | Gupta et al. ............. 705/4 |
| 2006/0235737 | A1 * | 10/2006 | Fleurant et al. ............. 705/8 |
| 2006/0271556 | A1 | 11/2006 | Mukherjee et al. |
| 2009/0198779 | A1 | 8/2009 | Agrawal et al. |
| 2010/0023502 | A1 | 1/2010 | Marlow |
| 2010/0042602 | A1 | 2/2010 | Smyros et al. |
| 2010/0082652 | A1 | 4/2010 | Jones et al. |
| 2011/0119249 | A1 | 5/2011 | Flatz et al. |
| 2011/0137888 | A1 | 6/2011 | Yoo et al. |
| 2011/0225167 | A1 | 9/2011 | Bhattacharjee et al. |
| 2011/0238654 | A1 | 9/2011 | Allen et al. |
| 2011/0246498 | A1 | 10/2011 | Forster |
| 2012/0117105 | A1 | 5/2012 | Thomas et al. |
| 2012/0197928 | A1 | 8/2012 | Zhang et al. |
| 2012/0330954 | A1 | 12/2012 | Sivasubramanian et al. |
| 2013/0018867 | A1 | 1/2013 | Regan et al. |
| 2013/0097599 | A1 | 4/2013 | Konik et al. |
| 2013/0097608 | A1 | 4/2013 | Kessler et al. |
| 2013/0282765 | A1 | 10/2013 | Bhattacharjee et al. |

OTHER PUBLICATIONS

Ben-Gan, Descending Indexes, Index Ordering, Parallelism, and Ranking Calculations, SQL Server Pro, May 24, 2010, 7 pgs.

Decipherinfosys, Column Order in a Composite Index, Systems Engineering and RDBMS, May 13, 2008, 4 pgs.

Quassnoi, Explain Extended, Descending Indexes, Apr. 27, 2009, 8 pgs.

Scharlock, Designing Composite Indexes, Sep. 26, 2008, 5 pgs.

* cited by examiner

Entity Database
142

| | Keys 502 | Metadata Components 504 | Content 506 |
|---|---|---|---|
| Entity0 | K0 | Kind=person, Name =John Doe, Birthdate = . . . | Entity0 Content |
| Entity1 | K1 | Kind=address, WorkAddress= . . . HomeAddress= . . . | Entity1 Content |
| Entity2 | K2 | Kind=status, Message= . . . Timestamp= . . . | Entity2 Content |
| Entity3 | K3 | Kind=counter, Name=Status Views, Value= . . . | Entity3 Content |
| Entity4 | K4 | Kind=counter, Name=Status Changes, Value= . . . | Entity4 Content |
| Entity5 | K5 | Kind=marker . . . Message= . . . Timestamp= . . . | Entity5 Content |
| Entity6 | K6 | Kind=marker . . . Message= . . . Timestamp= . . . | Entity6 Content |
| Entity7 | K7 | Kind=marker. . . Delta= . . . | Entity7 Content |

Figure 5A

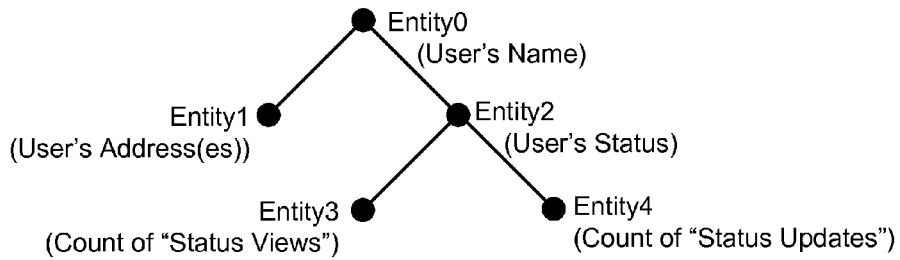

| | Key | Content |
|---|---|---|
| Entity0 | K0= person/0 | Name=John Doe |
| Entity1 | K1= person/0+address/1 | WorkAddress= 1 Circle Rd., Lodi, CA 95240 |
| Entity2 | K2= person/0+status/2 | Status="Anyone else hungry?" |
| Entity3 | K3=person/0+status/2 +counter/3 | Name=Status Views, Value=0 |
| Entity4 | K4=person/0+status/2 +counter/4 | Name=Status Changes, Value=5 |

Figure 5C

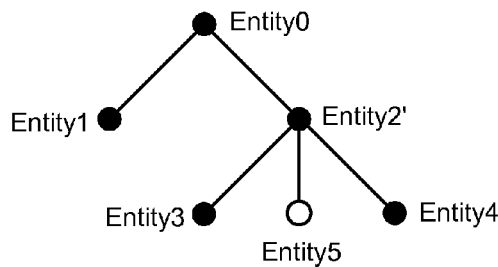

| | Key | Content |
|---|---|---|
| Entity0 | K0= person/0 | Name=John Doe |
| Entity1 | K1= person/0+address/1 | WorkAddress= 1 Circle Rd., Lodi, CA 95240 |
| Entity2' | K2= person/0+status/2 | Status="Making lunch plans..." |
| Entity3 | K3=person/0+status/2 +counter/3 | Name=Status Views, Value=0 |
| Entity4 | K4=person/0+status/2 +counter/4 | Name=Status Changes, Value=5 |
| Entity5 | K5=person/0+status/2 +marker/5 | Status change -> "Making lunch plans..." Timestamp = 12:20pm |

Figure 5D

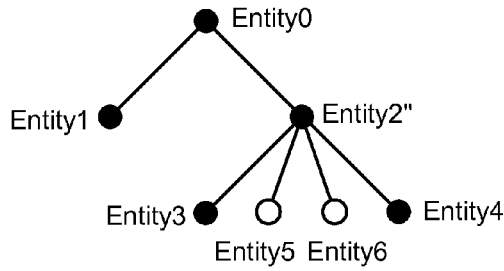

|  | Key | Content |
|---|---|---|
| Entity0 | K0= person/0 | Name=John Doe |
| Entity1 | K1= person/0+address/1 | WorkAddress= 1 Circle Rd., Lodi, CA 95240 |
| Entity2" | K2= person/0+status/2 | Status="Out to lunch!" |
| Entity3 | K3=person/0+status/2 +counter/3 | Name=Status Views, Value=0 |
| Entity4 | K4=person/0+status/2 +counter/4 | Name=Status Changes, Value=5 |
| Entity5 | K5=person/0+status/2 +marker/5 | Status change -> "Making lunch plans..." Timestamp = 12:20pm |
| Entity6 | K6=person/0+status/2 +marker/6 | Status change -> "Out to lunch!" Timestamp = 12:30pm |

Figure 5E

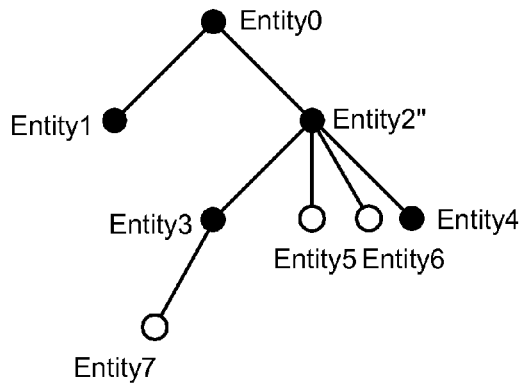

|  | Key | Content |
|---|---|---|
| Entity0 | K0= person/0 | Name=John Doe |
| Entity1 | K1= person/0+address/1 | WorkAddress= 1 Circle Rd., Lodi, CA 95240 |
| Entity2" | K2= person/0+status/2 | Status="Out to lunch!" |
| Entity3 | K3=person/0+status/2+counter/3 | Name=Status Views, Value=0 |
| Entity4 | K4=person/0+status/2+counter/4 | Name=Status Changes, Value=5 |
| Entity5 | K5=person/0+status/2+marker/5 | Status change -> "Making lunch plans..." Timestamp = 12:20pm |
| Entity6 | K6=person/0+status/2+marker/6 | Status change -> "Out to lunch!" Timestamp = 12:30pm |
| Entity7 | K7=person/0+status/2+counter/3+marker/7 | Delta=1 |

Figure 5F

STORING INFORMATION IN A TRUSTED ENVIRONMENT FOR USE IN PROCESSING DATA TRIGGERS IN AN UNTRUSTED ENVIRONMENT

RELATED APPLICATIONS

This application claims priority to U.S. Provisional Application Ser. No. 61/556,153, filed Nov. 4, 2011, entitled "Storing Information in a Trusted Environment for Use in Processing Data Triggers in an Untrusted Environment," which is incorporated by reference herein in its entirety.

This application is related to U.S. Application Ser. No. 13/431,915, filed Mar. 27, 2012, entitled "Processing Data Triggers in an Untrusted Environment Based on Information Stored in a Trusted Environment," which is incorporated by reference herein in its entirety.

FIELD OF THE INVENTION

The present invention relates generally to the field of distributed client-server computer network systems, and in particular, to a system and method for efficiently and securely processing data triggers.

BACKGROUND OF THE INVENTION

Applications are becoming increasingly data intensive. Creating infrastructure to manage large quantities of data in a distributed and efficient manner is complicated and time consuming. Many individual application developers are unable to devote resources to creating such infrastructure. Consequently individual application developers are at a disadvantage as compared with organizations that can create an efficient and secure distributed data infrastructure. Large organizations are frequently reluctant to provide access to a distributed data infrastructure to third-party application developers due to the risk that intentional or unintentional operations performed by the third-party application may impair functionality of the distributed data infrastructure. Even where third-party application developers are given access to the distributed data infrastructure, the functionality of the applications when performing common operations such as executing operations based on data triggers is frequently limited or slowed down in such a way that many of the advantages of using the distributed data infrastructure are greatly reduced or eliminated. Thus, conventional approaches fail to provide secure and efficient access to a distributed data infrastructure. These and other problems with conventional approaches to processing search queries described above are reduced or eliminated by the systems and methods described below.

SUMMARY

It would be advantageous to provide a system and method for processing data triggers in an untrusted environment based on information stored in a trusted environment that enables an untrusted application to interact with data stored in a trusted environment in a secure and efficient manner. In particular, an approach that enables data triggers to be performed in an untrusted environment based on data stored in a trusted environment would enable an untrusted application in the untrusted environment to take advantage of a distributed data infrastructure that resides in a trusted environment. In particular, dividing up the process of processing data triggers into a first stage for modifying data items and storing markers indicating that the data items have been modified and a second stage for retrieving markers and processing data triggers based on the markers, enables an third-party application developer to have access to a secure distributed data infrastructure. More specifically, this arrangement enables interactions with data items to be performed synchronously with the request and allows operations corresponding to data triggers to be executed asynchronously, so that they do not reduce performance of the untrusted application. Furthermore, because data triggers are processed in the untrusted portion, the data triggers can have arbitrary functions without jeopardizing the stability of the distributed data infrastructure. Specific embodiments for efficiently and securely processing data triggers are described in greater detail herein.

In some embodiments, a method is performed in a trusted environment of a server system having one or more processors and memory storing one or more programs for execution by the one or more processors so as to perform the method. The method includes receiving at one or more internal (e.g., trusted) processes, from a first external (e.g., untrusted) process of one or more external processes, a first request to interact with a first data item stored in a database. The method further includes, in response to the first request performing a first interaction with the first data item in accordance with the first request and storing, at a location in the database that is associated with the first data item, a first marker indicative of the first interaction with the first data item. The method also includes, after storing the first marker, identifying, in the database, a plurality of markers corresponding to a plurality of data items stored in the database, the plurality of markers including the first marker and retrieving, from the database, information corresponding to the plurality of markers that enables a determination, for each data item in the plurality of data items, as to whether an operation corresponding to the data item is to be executed. The method further includes, when a determination has been made that a first operation corresponding to the first data item is to be executed, executing the first operation.

In some embodiments, a method is performed in an untrusted environment of a server system having one or more processors and memory storing one or more programs for execution by the one or more processors so as to perform the method. The method includes, at one or more internal (e.g., untrusted) processes preparing to request performance of a first interaction with a first data item stored in a database by an external process of one or more external (e.g., trusted) processes. The preparing includes determining whether the first interaction meets a first trigger condition and in accordance with a determination that the first interaction meets the first trigger condition, generating a first marker that includes information identifying the first data item. The method further includes sending a first request to an external process to perform the first interaction with the first data item and store the first marker in the database. The method also includes, after sending the first request sending a second request to an external process of the plurality of external processes for markers stored in the database and receiving, in response to the second request, a plurality of markers corresponding to a plurality of data items stored in the database, including the first marker. The method further includes determining, for each data item in the plurality of data items, whether an operation corresponding to the data item is to be executed, and in accordance with a determination that a first operation corresponding to the first data item is to be executed, sending a third request to an external process of the plurality of external processes to execute the first operation.

In accordance with some embodiments, a computer system (e.g., a client system, application server system or datastore server system) includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which when executed by one or more processors, cause a computer system (e.g., a client system, application server system or datastore server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 5A is a block diagram illustrating an entity database storing information about entities having properties, unique identifiers (keys) and content, in accordance with some embodiments.

FIGS. 5C-5H are block diagrams illustrating markers that indicate changes to a database over time and using the markers to process data triggers, in accordance with some embodiments.

DESCRIPTION OF EMBODIMENTS

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The embodiments described below include client and server systems, which typically inter-operate in a distributed client-server system and corresponding methods of organizing, storing and indexing information (e.g., entities) so as to enable the information to be efficiently retrieved in response to search queries.

Figure 1:
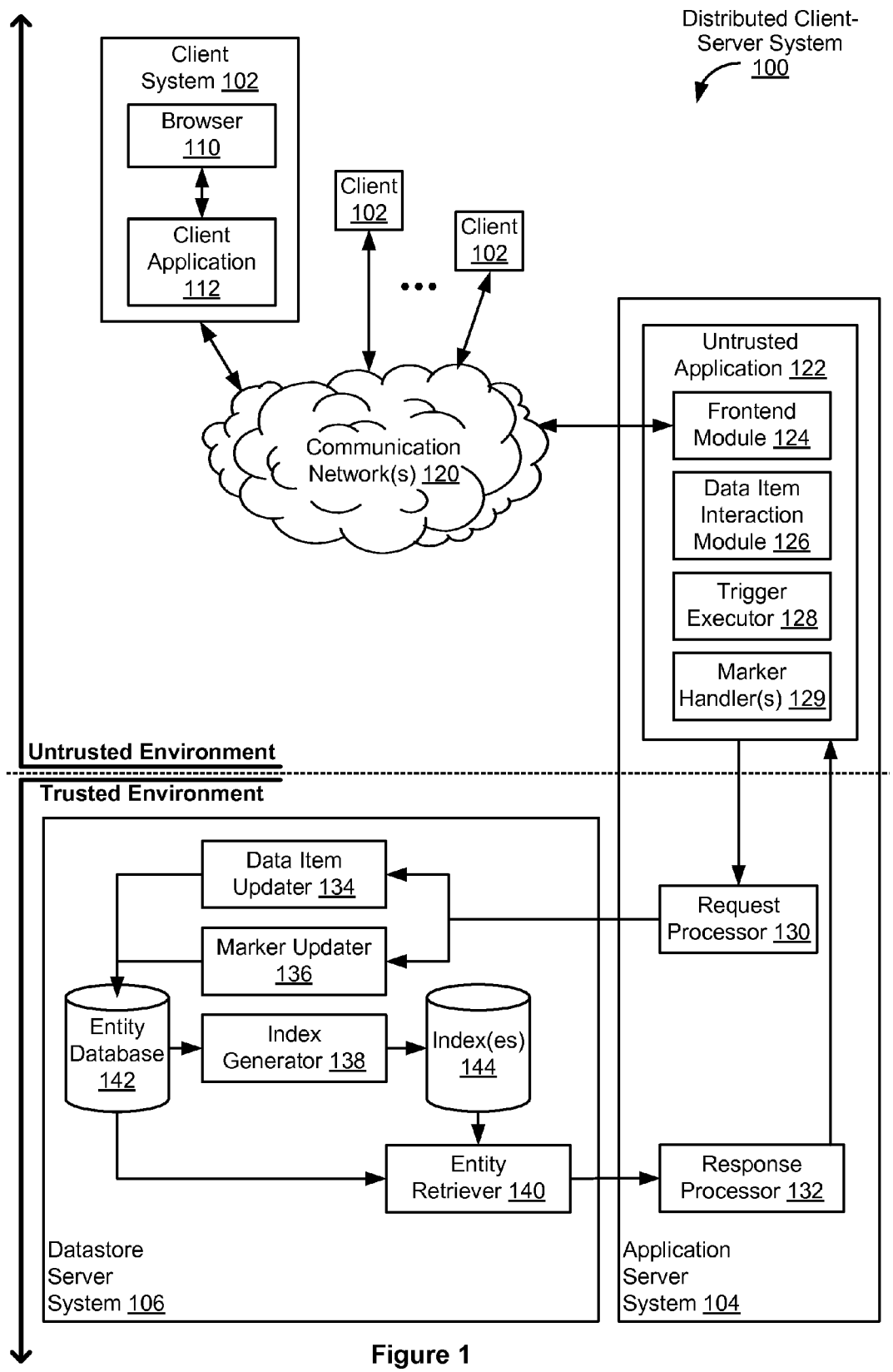
FIG. 1 is a block diagram illustrating a distributed client-server system, in accordance with some embodiments.

FIG. 1 includes a block diagram illustrating an exemplary distributed client-server system 100 for modifying data and processing data triggers based on the modified data. System 100 includes one or more Client System(s) 102 (also referred to herein as "Client 102"), an Application Server System 104 (also referred to herein as "App Server 104"), a Datastore Server System 106 (also referred to herein as "Data Server 106") and a Communication Network 120 for connecting Clients 102 to Application Server System 104. Communication Network 120 optionally includes the Internet, one or more local area networks (LANs), one or more wide area networks (WANs), other types networks, or a combination of such networks. Additionally, it should be understood that Data Server 106 and App Server 104 are also connected via a communication network such as the Internet, one or more local area networks (LANs), and/or one or more wide area networks (WANs). In some embodiments, the App Server 104 and the Data Server 106 are combined as part of a single server system and/or different functions of the two server systems are divided differently than shown in the exemplary configuration of FIG. 1.

Client 102 optionally includes Browser 110 and Client Application 112. Browser 110 can be a general purpose Internet browser (sometimes called a Web browser) having a browser window used for displaying a client application (e.g., an email application or a social networking application). A web application user interface including data items associated with the client application is optionally implemented using hypertext markup language (HTML) or XML elements that are rendered by Browser 110. Alternatively, requests to interact with data items are, optionally, submitted via a stand-alone Client Application 112. After a user submits a request to interact with data items through Browser 110 or a stand-alone Client Application 112, Client 102 relays the request to App Server 104 via Communication Network 120. App Server 104 performs operations corresponding to the request and, optionally, sends a set of display information back to Client 102. Client Application 112 and/or Browser 110 uses the display information to render updated application information at Client 102.

Application Server System 104 includes Untrusted Application 112 that includes a Frontend Module 124, Data Item Interaction Module 126, Trigger Executor 128 and one or more Marker Handler(s) 129. Untrusted Application 112 serves as a "back end" for the Client Application 112 at Client 102 and handles requests issued by Client Application 112. App Server 104 may host many different untrusted applications, each of which serves as a "back end" for its own client application. Additionally one untrusted application may serve as a "back end" for multiple different client applications. App Server 104 also includes a Request Processor 130 and Response Processor 132 in a trusted portion of App Server 104. Frontend Module 124 receives request from and sends responses to Client Application 112 or Browser 110. Data Item Interaction Module 126 processes requests from Client 112 to determine data item interactions to perform at Data Server 106. Trigger Executor 128 determines whether the data item interactions meet trigger conditions and, if a data item interaction meets a trigger condition, generates instructions for Data Server 106 to store a marker indicative of the trigger condition. Marker Handler 129 processes markers retrieved form Data Server 106 and determines whether operations are to be executed based on the markers.

In some implementations, Untrusted Application 122 is a hosted application from a third-party (e.g., an entity that is not the user of Client 112 or the owner/operator of Data Server 106 and App Server 104) that is confined to an application sandbox. The application sandbox restricts communications between Untrusted Application 122 and Data Server 106 so as to limit the effect of intentional or unintentional pathological operations occurring within Untrusted Application 122 on App Server 104 and Data Server 106. The application sandbox also serves to provide a set of restrictions on the flow of information and requests between the untrusted environment of System 100 (e.g., Client 102 and Untrusted Application 122) and the trusted environment in System 100 (e.g., Data Server 106 and trusted processes in App Server 104 such as Request Processor 130 and Response Processor 132). In the untrusted environment, users and application developers are allowed to perform operations without restrictions that would otherwise be necessary to protect the integrity of the trusted environment. Request Processor 130 receives requests from Untrusted Application 122, optionally applies sandbox policies to ensure that the requests are safe and transmits corresponding requests to Data Server 106. Response Processor 132 receives responses to the corresponding requests from Data Server 106, optionally translates the responses, and relays information corresponding to the responses to Untrusted Application 122.

Datastore Server System 106 includes Data Item Updater 134, Marker Updater 136, Entity Database 142, Index Generator 138, Indexes 144 and Entity Retriever 140. Data Item Updater 134 updates, adds and deletes data items from Entity Database 142 in accordance with requests from Untrusted Application 122 and other applications. Marker Updater 136 updates, adds and deletes markers from Entity Database 142. Index Generator 138 processes information about the entities stored in Entity Database 142 to produce Indexes 144 for use by Entity Retriever 140. Entity Retriever 140 identifies entities in Entity Database 142 for use in preparing responses to requests from Untrusted Application 122 on App Server 104. Alternatively or in addition, Index Generator 138 retrieves information about entities from a remote source such as a remote database or web crawler that systematically retrieves information from a plurality of remote sources (e.g., websites).

In some embodiments Indexes 144 are generated prior to receiving requests from Untrusted Application 122 and Index Generator 138 continues to update Indexes 144 in between requests from Untrusted Application 122. Generating Indexes 144 prior to receiving the requests for access to entities increases the speed with which entities can be retrieved, thereby reducing latency of performing requested application interactions. Once entities have been retrieved by Entity Retriever 140 and passed to Response Processor 132, which transmits the entities to Untrusted Application 122, Untrusted Application 122 can generate an updated application state to deliver to Client 102, via Frontend Module 124 and Communication Network 120, for display at Client 102 (e.g., via Browser 110 or Search Application 112).

Figure 2:
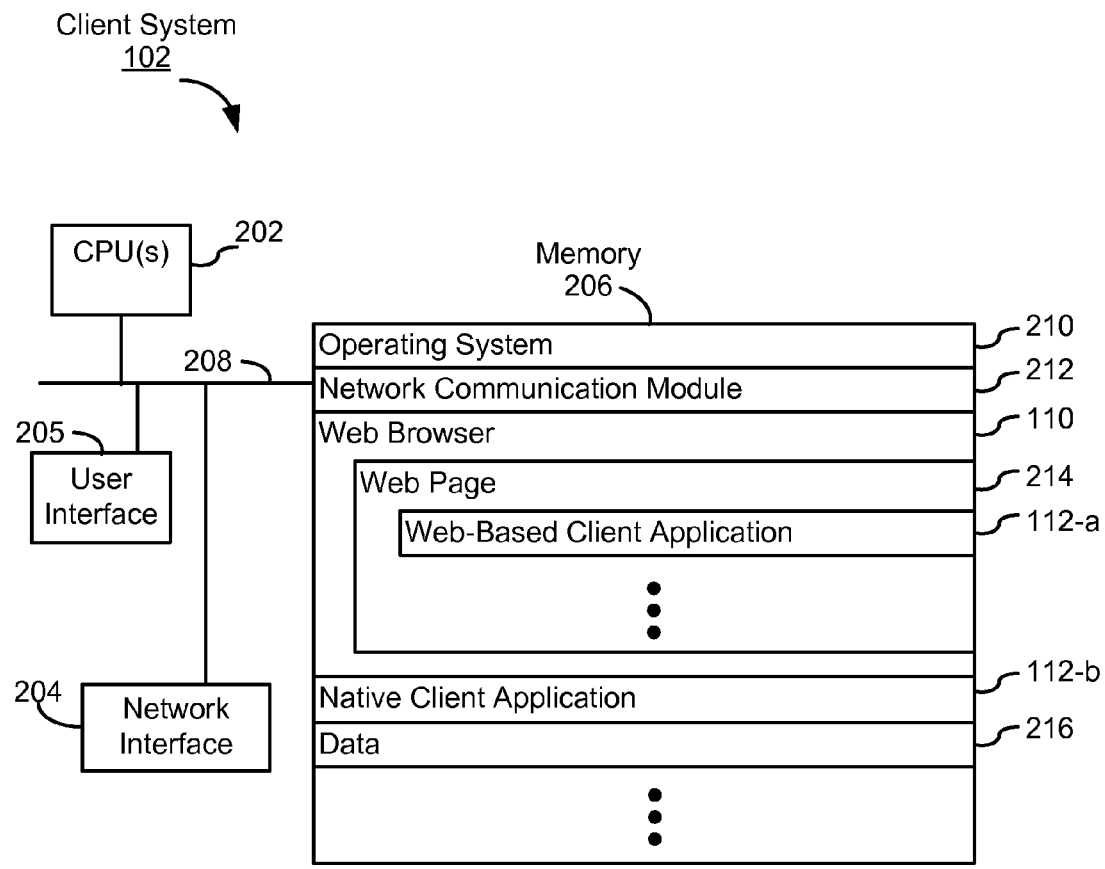
FIG. 2 is a block diagram illustrating a client system, in accordance with some embodiments.

FIG. 2 is a block diagram illustrating a Client System 102 in accordance with some embodiments. Client 102 typically includes one or more processing units CPU(s) 202, one or more network or other Communication Interfaces 204, Memory 206 a User Interface 205 comprising a display device and a keyboard, mouse, touchpad, touchscreen or other input device, and one or more Communication Buses 208 for interconnecting these components. Communication Buses 208 optionally include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

- Operating System 210 that includes procedures for handling various basic system services and for performing hardware dependent tasks;
- Network Communication Module (or instructions) 212 that is used for connecting Client 102 to other computers (e.g., App Server 104 and Data Server 106) via one or more Network Interfaces 204 (wired or wireless) and one or more Communication Networks 120 (FIG. 1), such as the Internet, other wide area networks, local area networks, metropolitan area networks, and so on;
- Web Browser 110 for loading web pages such as a Web Page 214 including a web application, which optionally includes code for executing a Web-Based Client Application 112-a as an embedded application in Web Page 214, where Web-Based Client Application 112-a displays application interface information received from App Server 104;
- Client Application 112-b (e.g., a stand-alone email client) for sending requests to App Server 104 and displaying data received from App Server 104 (e.g., from Untrusted Application 122 in FIG. 1); and
- optionally, Data 216 such as cached application data (e.g., recently accessed search results, recently viewed data items, etc.).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 optionally stores additional modules and data structures not described above.

Figure 3:
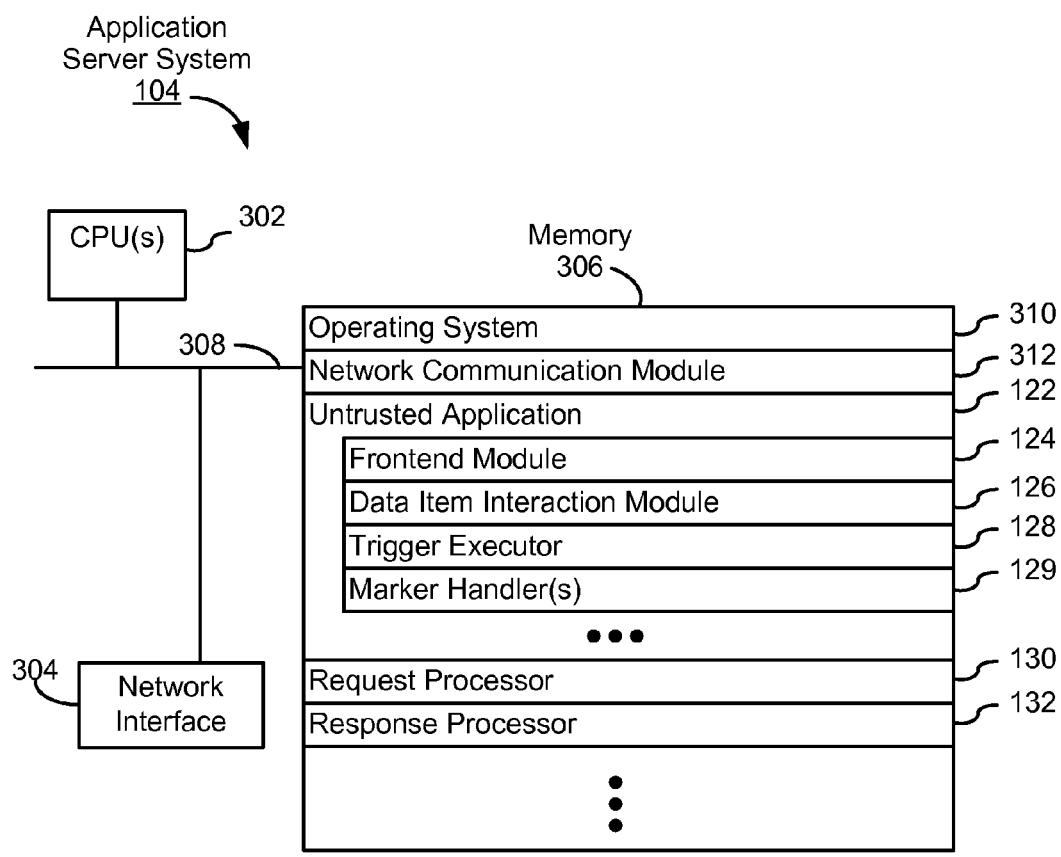
FIG. 3 is a block diagram illustrating an application server system, in accordance with some embodiments.

FIG. 3 is a block diagram illustrating an Application Server System 104 in accordance with some embodiments. Application Server System 104 typically includes one or more processing units CPU(s) 302, one or more network or other Communications Interfaces 308, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

- Operating System 310 that includes procedures for handling various basic system services and for performing hardware dependent tasks;
- Network Communication Module (or instructions) 312 that is used for connecting App Server 104 to other computers (e.g., Client 102) via one or more Network Interfaces 304 (wired or wireless) and one or more Communication Networks 102 (FIG. 1), such as the Internet, other wide area networks, local area networks, metropolitan area networks, and so on;
- Untrusted Application 122 for communicating with Client Application 112 (FIG. 2), where Untrusted Application 122 has limited permissions to perform operations within a trusted environment and includes one or more of:
  - Frontend Module 124 for coordinating communication between Untrusted Application 122 and Client Applications with which App Server 104 communicates;
  - Data Item Interaction Module 126 for generating requests to retrieve and/or modify data items stored at Data Server 106 and generating application information to be transmitted to Client 102, where the application information specifies information to display at Client 102;
  - Trigger Executor 128 for processing data triggers and generating markers indicative of results of the data trigger processing; and
  - Marker Handlers 129 for determining operations to perform based on markers received from Data Server 106;
- Request Processor 130 for processing requests from Untrusted Application 122, transmitting requests to Data Server 106 and, optionally, applying sandbox policies to ensure that the requests are safe to transmit to Data Server 106;
- Response Processor 132 for processing responses from Data Server 106 to requests from Untrusted Application 122, transmitting responses to Untrusted Application 122 and, optionally, translating the responses to a format suitable for delivery of the responses to Untrusted Application 122.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows an "Application Server System" 104, FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement an Application Server System 104 and how features are allocated among them will vary from one implementation to another, and optionally depends in part on the amount of data traffic that the system must handle during peak usage periods as well as during average usage periods.

Figure 4:
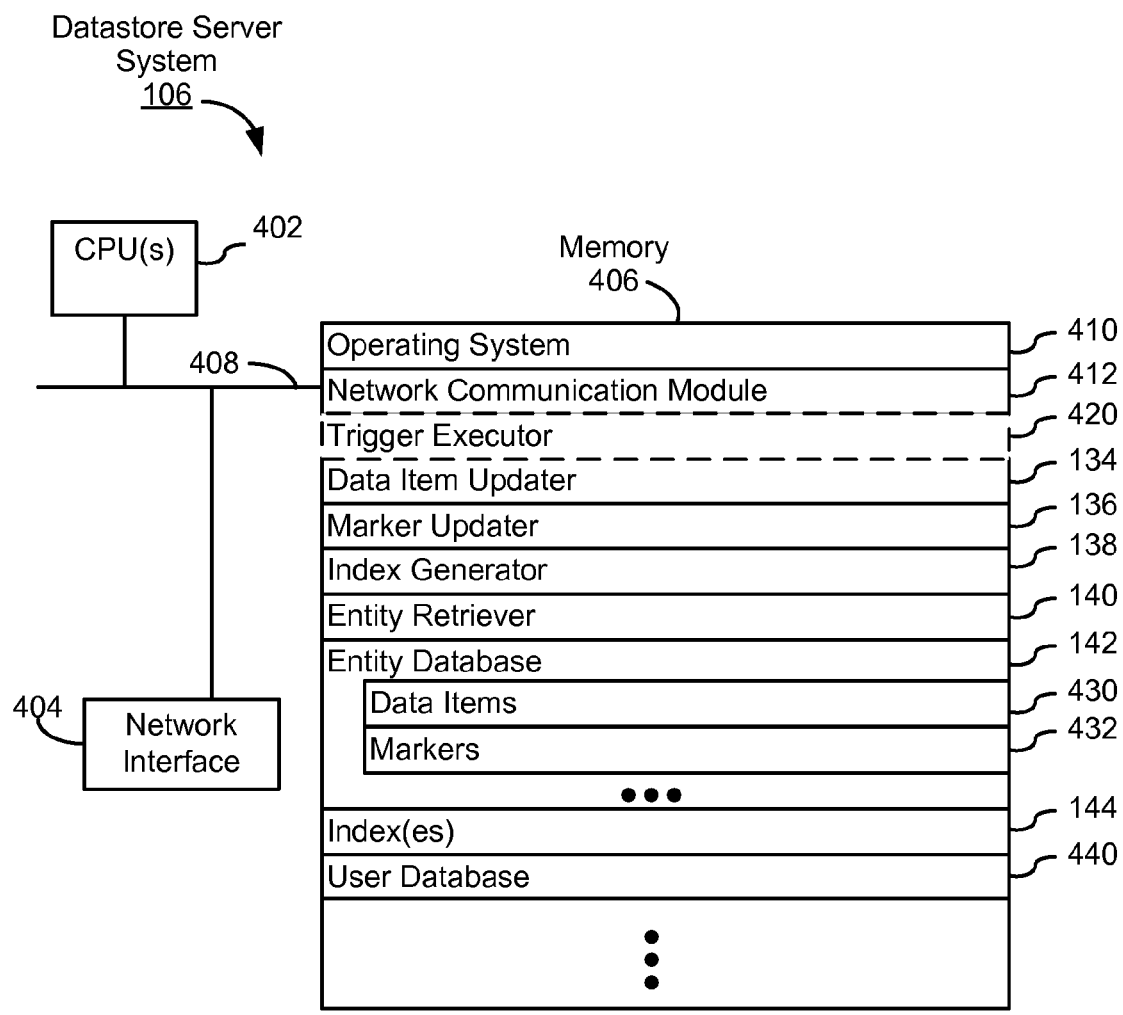
FIG. 4 is a block diagram illustrating a datastore server system, in accordance with some embodiments.

FIG. 4 is a block diagram illustrating a Datastore Server System 106 in accordance with some embodiments. Datastore Server System 106 typically includes one or more processing units CPU(s) 402, one or more network or other Communications Interfaces 408, Memory 406, and one or more Communication Buses 408 for interconnecting these components. Communication Buses 408 optionally include circuitry (sometimes called a chipset) that interconnects and controls communications between system components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

- Operating System 410 that includes procedures for handling various basic system services and for performing hardware dependent tasks;
- Network Communication Module (or instructions) 412 that is used for connecting Data Server 106 to other computers (e.g., Client 102) via one or more Network Interfaces 404 (wired or wireless) and one or more Communication Networks 102 (FIG. 1), such as the Internet, other wide area networks, local area networks, metropolitan area networks, and so on;

optionally, Trigger Executor 420 for processing data triggers and generating markers indicative of results of the data trigger processing (Trigger Executor 420 at Data Server 106 may be used instead of or in addition to Trigger Executor 128 at App Server 104);

Data Item Updater 134 for updating data items in Entity Database 142, by adding, removing and/or modifying data items stored in Entity Database 142;

Marker Updater 136 for updating markers in Entity Database 142, by adding, removing and/or modifying markers stored in Entity Database 142;

Index Generator 138 for generating indexes for use in retrieving entities from Entity Database 142, in some implementations Index Generator 138 generates a large number of indexes (e.g., at least one index for each property that can be used to sort and/or filter search results) so that for each possible combination of filters and sort orders in a search query, there exists an index including an index portion where the index entries matching the combination of filters are arranged in a contiguous block of index entries sorted in the sort order;

Entity Retriever 140 for retrieving entities from Entity Database 142 (e.g., in response to requests for the entities from Untrusted Application 122 in FIG. 3);

Entity Database 142 for storing entities and/or information about entities including one or more data items 430 and one or more markers 432;

one or more Indexes 144 for storing information about entities and properties of the entities, in some embodiments the Indexes 144 are each sorted in accordance with values of the properties for the entities; and User Database 440 for storing information about users and user search preferences, in some embodiments when the entities are user specific (e.g., a collection of a user's photos, emails or other documents), and User Database 440 stores information identifying which entities and indexes a particular user has authority to access, User Database 440, optionally, stores other user account information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Datastore Server System" 106, FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a Datastore Server System 106 and how features are allocated among them will vary from one implementation to another, and optionally depends in part on the amount of data traffic that the system must handle during peak usage periods as well as during average usage periods.

Entities and Indexes

FIG. 5A illustrates an entity database storing information about entities (data items and markers) having keys 502 (unique identifiers), metadata components 504 and content 506 of the entities according to some embodiments. In some embodiments, an entity has one or more metadata components, each metadata component having a component type (e.g., kind or property) and a component value of one or more possible values (e.g., floating point values, strings, dates, and binary data). A particular metadata component can have one or more valid component values. For example, for a metadata component of the type "tag" for a particular entity could have a value for each tag associated with the particular entity (e.g., "vacation" "mom" "California," etc. could all be values for the "tag" metadata component for the entity). A property with multiple values can have values of mixed types (e.g., for a particular entity a property could have one value that is an integer and another value that is a string).

In some implementations, a search query including a filter (e.g., property=value) for a property with multiple values tests whether any of the values meets the filter. Thus, in these implementations, if a respective entity includes a metadata component with values A=1 and A=2, a search for all entities with the property A=1 will return the respective entity. Additionally, it should be understood that the values of these properties can be used either as predefined sort parameters or to determine whether respective entities meet filter criteria. In some embodiments, one of the possible component types is a "content" component type, where the value of the content component for a respective entity is Content 506 of the respective entity (e.g., the body text of a document, image data for an image, etc.) or a unique identifier that enables Content 506 for the respective entity to be retrieved from a separate content storage system.

Each entity also has a key that uniquely identifies the entity, also called a "unique identifier" for the entity. In some implementations, a key is simply an Entity ID that is associated with the entity (e.g., assigned by Data Server 106). In other implementations the key includes the Entity ID and other information (e.g., an application identifier and/or other information that is indicative of a logical division of the entity database to which the entity has been assigned, or information about other related entities). An entity can be requested by Client 102 either by submitting a request for an entity associated with a particular key, or by requesting performance of a search query that matches the entity's properties. A search query that matches the entities properties will typically first produce the key for the matching entity and then retrieve the entity or information representative of the entity from Entity Database 142. Unlike some conventional relational databases, in some implementations, Entity Database 142 does not require that all entities of a given kind have the same properties.

In some embodiments Entity Database 142 has a tree structure and keys respective child entities correspond to a concatenation of the keys and kinds of one or more ancestor entities of the respective child entities. In the example shown in FIG. 5A, there are seven entities, where Entity0-Entity4 are data items and Entity5-Entity7 are markers. Data items are entities that correspond to user created or system created data that is accessible to the user, while markers are temporary entities associated with respective data items that are generated by the system to indicate that a change has been made to a data item. These markers are used by applications for processing data triggers and are generally not provided to users. In some implementations markers do not include any content and the presence of a marker is sufficient to indicate that a change has been made to an associated data item. In other implementations markers optionally include content that indicates information about the nature of the change that was made to the data item associated with the marker.

Figure 5B:
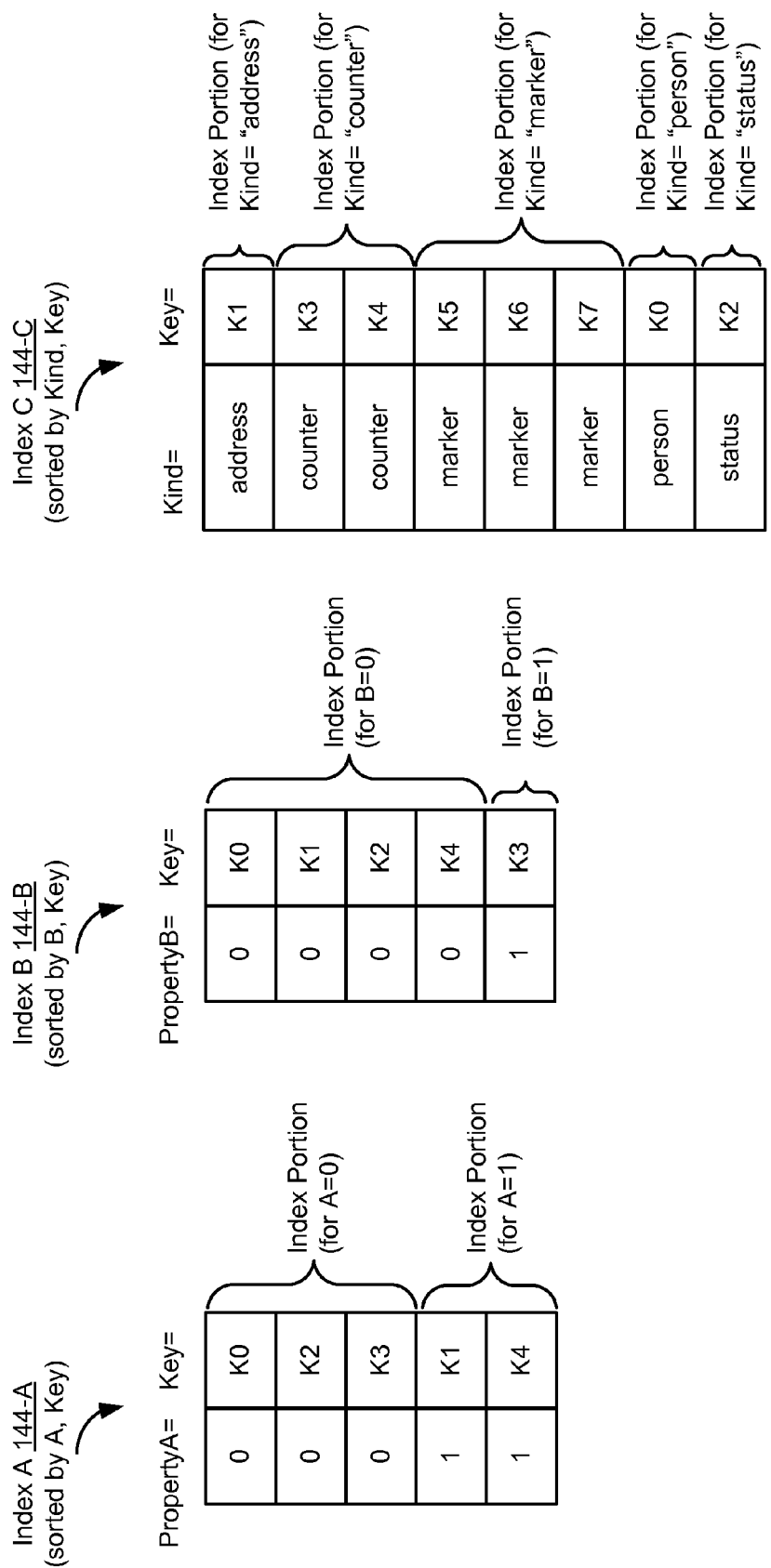
FIG. 5B is a block diagram illustrating a set of indexes for different properties for a plurality of entities having multiple properties and unique identifiers (keys), in accordance with some embodiments.

FIG. 5B illustrates exemplary Indexes 144 for different properties for a plurality of entities having multiple properties and unique identifiers (keys). The indexes (Index A 144-A, Index B 144-B and Index-C 144-C) illustrated in FIG. 4B each have a plurality index entries (rows) sorted in accordance with values of a metadata component of a particular metadata component type (e.g., property or kind) and a key (columns). In some implementations, there is an index entry for each value of a property of an entity. Thus, if there is a multi-valued property, there will be at least two index entries for the entity (e.g., two index entries in the same index with the same key but different filter values), one sorted in accordance with the first value of the property and another sorted in accordance with the second value of the property.

Each of the exemplary indexes in FIG. 5B is adapted for responding to queries including a filter on the respective component type (e.g., property or kind) included in the index (e.g., PropertyA for Index A 144-A, PropertyB for Index B 144-B or Kind for Index C 144-C). The indexes include portions that are indicated by the component values. For example, Index A 144-A has two portions, a portion where PropertyA=0 and a portion where PropertyA=1, and these portions are internally contiguous portions (e.g., a contiguous set of index entries where A=0 and a contiguous set of index entries where A=1) because Index A 144-A is sorted in accordance with the values of property A. Similarly, Index B 144-B also has two portions, a portion where PropertyB=0 and a portion where PropertyB=1, and these portions are internally contiguous portions (e.g., a contiguous set of index entries where B=0 and a contiguous set of index entries where B=1) because Index B 144-B is sorted in accordance with the values of property B. Index C 144-C is sorted in a similar manner, but has five different portions because there are five different values for Kind in the exemplary set of entities shown in FIGS. 5A-5B. The portions for Index C 144-C include: a portion where Kind=address, a portion where Kind=counter, a portion where Kind=marker, a portion where Kind=person, and a portion where Kind=status, and these portions are internally contiguous portions because Index C 144-C is sorted alphabetically in accordance with the values for Kind.

Additionally, in some embodiments each of the index portions are internally sorted in a default sort order (e.g., the index entries within a portion are sorted by key, which is not typically a user selected sort order, as the values of the keys are not usually known by the user and frequently do not correspond to any property that is relevant to the user). It should be understood that a typical index may have thousands or hundreds of thousands or millions of index entries and thus index portions will frequently contain many more index entries than those illustrated in FIG. 5B. Additionally, it should be noted that in some implementations markers do not have values for some or all of the possible properties (e.g., PropertyA or PropertyB). Thus, there are no index entries in Index A or Index B for the markers with keys K5-K7, as the markers do not have values for PropertyA or PropertyB.

Creating indexes that are sorted by kind and/or by property can dramatically improve performance when searching for entities that have particular characteristics. Thus, in some embodiments, when a search query is received, indexes are selected to perform the search query based on the properties that are included in the index. Moreover, when processing a search query specifying a filter, Data Server 106 can perform the query using only index entries matching the search query in the portion of the index matching the filter, because the index is sorted so that index entries in all other sections of the index do not match the filter and thus are irrelevant to the search query. For example, for a search query including the filter A=0, results (e.g., identifiers of index entries) will be retrieved from the portion of Index A that corresponds to A=0, and the portion of Index A where A=1 will be ignored. Thus, in some embodiments, for each property for which a search can be performed, there is an index that is sorted in accordance with values of that property.

In one implementation, Data Server 106 provides search services for a plurality of different applications, and each application has its own set of indexes for performing search queries. In these implementations each application (e.g., Untrusted Application 122) defines its indexes in a configuration file. Additionally, indexes for some types of commonly received queries are optionally provided automatically by Data Server 106. During development of the application, Data Server 106 can automatically add suggestions for new indexes to create to the configuration file when it encounters a search query that cannot be performed because indexes adapted for performing the search query have not been created. Additionally, a developer of the application can manually specify indexes to be created in anticipation of search queries that are likely to be executed by the application. As the entities in Entity Database 142 are updated, Data Server 106 updates the indexes (e.g., by updating the values for properties for the entities when the entities are modified). When a user requests that the application execute a search query, the search query is passed to Data Server 106, which generates search results using indexes corresponding to the search query. In some circumstances, multiple index portions will be used to respond to a single search query (e.g., when a search query such as A=1 AND B=1, A=1 NOT B=1, or A=1 OR B=1 is performed both Index A 144-A and Index B 144-B are used to respond).

Markers

FIGS. 5C-5H walk through an example where a user "John Doe" updates his status three times from "Anyone else hungry?" (at 12:15 pm) to "Making lunch plans . . . " (at 12:20 pm) and finally to "Out to lunch" (at 12:30 pm). In this example, Entity0 represents the user and has a Kind=person and initially has two child entities, Entity1 and Entity2. Entity1 represents the user's address(es) (e.g., a work address and a home address), has a Kind=address and initially has no child entities. Entity2 has Kind=status, represents the user's status (e.g., a short string of text updated periodically by the user and published to a group of followers/friends) and initially has two child entities. Entity3 has Kind=counter, represents a number of times that the user's status has been viewed (alternatively this could represent the number of comments associated with the user's status) and initially has no child entities. Entity4 has Kind=counter, represents a number of changes to the user's status in a predefined time period (e.g., the number of changes in the last X days) and initially has no child entities. In the example shown in FIG. 5C, the user's status has already been changed 5 times within the predefined time period and thus Entity4 shows a count of 5.

Throughout FIGS. 5C-5H, data items are illustrated as solid black dots, while markers are illustrated as white dots, for clarity.

As shown in FIG. 5C, John Doe's status is initially "Anyone else hungry?" At 12:20 pm, the status is updated to read "Making lunch plans . . . " as shown in FIG. 5D. As part of a single transaction, the update to the status is committed to the entity database and a marker (Entity5) is added as a child of Entity2 to indicate that Entity2 has been updated. It should be noted that Entity4, which represents the number of changes to the user's status in a predefined time period, has not been updated as part of this transaction. Rather, the number of changes to the user's status in a predefined time period is a separate data item (Entity4) that is updated by running a marker handler that processes markers associated with the user's status (Entity2) and determines a number of new changes that have occurred to the user's status since the last time that the handler ran. While, in this simplified example, this system of delayed processing of data triggers may not save a large amount of time, in a situation where a single change to a data item triggered a large number of operations and/or the single change triggered a computationally intensive operation, committing the change to the entity database and writing a marker indicating that the change has been committed may be many times faster than waiting until all of the operations have been performed to commit the change to the entity database. In this example, Entity5 is a marker that includes content that indicates what the status was changed to and a timestamp of the change.

Similarly, at 12:30 pm, John Doe's status is updated again to read "Out to lunch!" as shown in FIG. 5E. As part of a single transaction, the update to the status is committed to the entity database and a marker (Entity6) is added as a child of Entity2 to indicate that Entity2 has been updated again. In this example, Entity6 is a marker that includes content that indicates what the status was changed to and a timestamp of the change. It should be noted that Entity4, which represents the number of changes to the user's status in a predefined time period has still not been updated as part of this transaction, as a marker handler has not yet been run that processes the stored markers (e.g., Entity5 and Entity6).

Figure 5G:
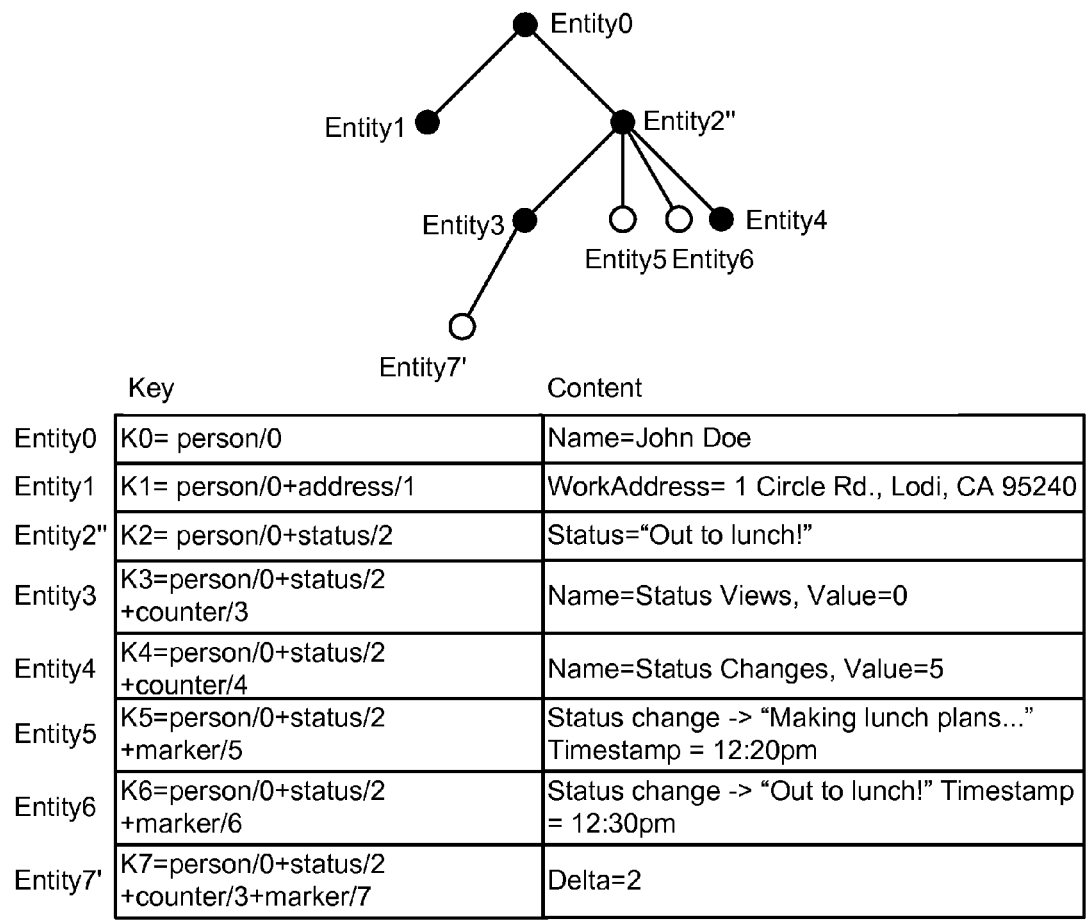

After the user's status has been updated as shown in FIG. 5E, the user's status is viewed once, and a marker (Entity7) is stored as a child of the data item for the "view count" counter (Entity3) indicating that the status has been viewed once, as shown in FIG. 5F. Subsequently, the status is viewed a second time, and the marker (Entity7) indicating that the status has been viewed once is updated to indicate that the status has been viewed twice, as shown in FIG. 5G. However in both of these cases even though the user's status has been viewed, the view count data item (Entity3) is not updated, because a marker handler has not yet been run to process the markers and generate modifications to data items (e.g., Entity3) in accordance with the markers. Additionally, it should be noted that throughout this process, no changes have been made to the address(es) of the user or the user name and thus the data items associated with these values Entity0 and Entity1 have not been updated and no markers associated with these values have been stored. Alternatively, in some situations, Entity3 does not exist prior to the user's status being viewed. In some implementations, a marker can be created for an entity that does not yet exist by storing a marker that indicates that it is a child of a nonexistent entity. In these implementations, when a marker handler processes the marker (e.g., Entity7), the marker handler will create a new entity that is the parent of the processed marker. Thus, in these embodiments, instead of having Entity3 present in FIGS. 5C-5G, only Entity7 would be present, and Entity3 would be created as part of running one or more marker handlers as described below with reference to FIG. 5H.

Figure 5H:
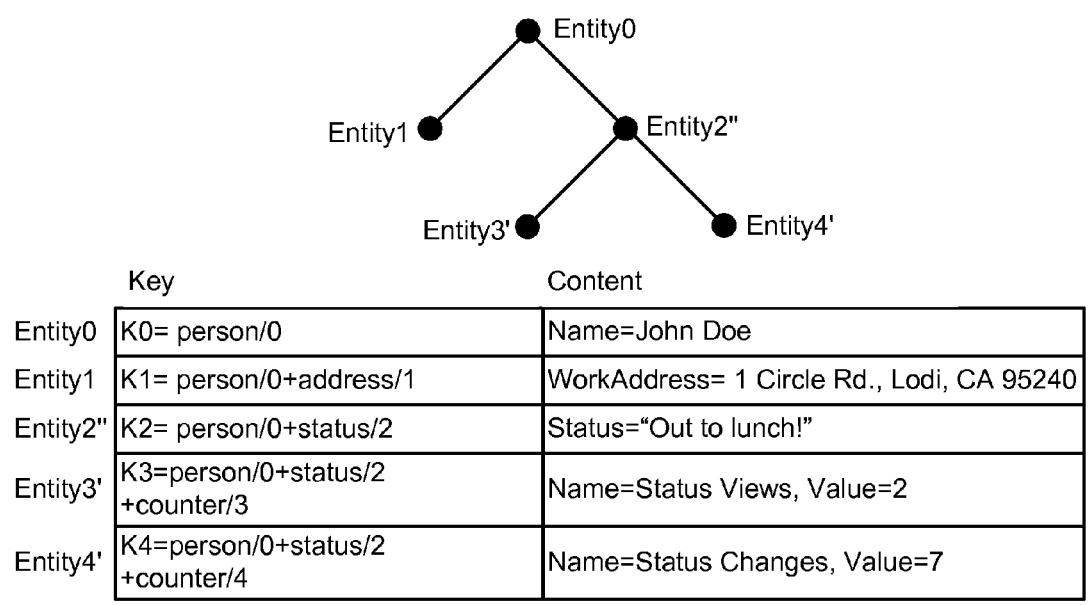

In FIG. 5H, the markers stored in the entity database are retrieved, evaluated by the untrusted application via one or more marker handlers, and a set of one or more operations are performed on the data items in accordance with the information stored in the markers. In particular, in this example, Entity3 is updated from Value=0 to Value=2 based on the information stored in Entity7. As part of the same transaction that updates Entity3, Entity7 is deleted, as information that was indicated by the marker has been used to update the entity database. Additionally, Entity4 is updated to indicate that the number of changes to the user's status in a predefined time period has been increased by two to "7" in accordance with the information stored in Entity5 and Entity6 (e.g., the device determines that two status changes have occurred that are indicated by markers). As part of the same transaction that updates Entity4, Entity5 and Entity6 are deleted, as information that was indicated by these markers has been used to update the entity database. Alternatively, in some implementations, Entity4 does not exist, and the markers (e.g., Entity5 and Entity6) are used to indicate to the untrusted application that an operation (e.g., reporting the updated status to contacts of the user) that does not have an effect on the data stored in the entity database is to be performed. In these implementations, once the untrusted application has requested execution of the operation and optionally verified execution of the operation, or has executed the operation, the untrusted application transmits a request (e.g., via the trusted portion of App Server 104) to delete the markers (e.g., Entity5 and Entity6) from the database.

Additionally, it should be noted that in the example described above with reference to FIGS. 5A-5G, the respective key for each of the respective entities includes information indicating a key and kind of each of the ancestors of the entity. For example, Entity2 is the child of Entity0 and thus the key for Entity2 includes a unique key (e.g., 2), and optionally, a kind (e.g., "address") of Entity2, as well as information indicating the unique key (e.g., 0) of Entity0 and the kind (e.g., "person") of Entity0. A similar pattern holds true for the keys of all of the entities in this example. Thus for a key of an entity in this example, a parent or grandparent of the entity can be identified and the parent or grandparent entity can be retrieved from the key of the entity (e.g., the key for Entity7 indicates that it is a child of Entity3, which in turn is a child of Entity2). It should be understood that the syntax shown for the keys in FIGS. 5A-5G is merely illustrative and the information could be represented in many different ways. A particularly useful feature of using keys that are based on keys and kinds of ancestor entities is that retrieving the key of a marker will reveal the key and kind of the parent of the marker. Thus, in many situations (e.g., where the data trigger is concerned with the fact that a data item has changed and the presence of a marker indicates that a change has been made to the parent of the marker), the determination as to whether a data trigger condition has been met can be made based on examining the keys of one or more markers without the need to retrieve content of the marker, as the key of a marker marking a change to an entity includes an identifier for the entity that has been modified.

Data Trigger Overview

Figure 6A:
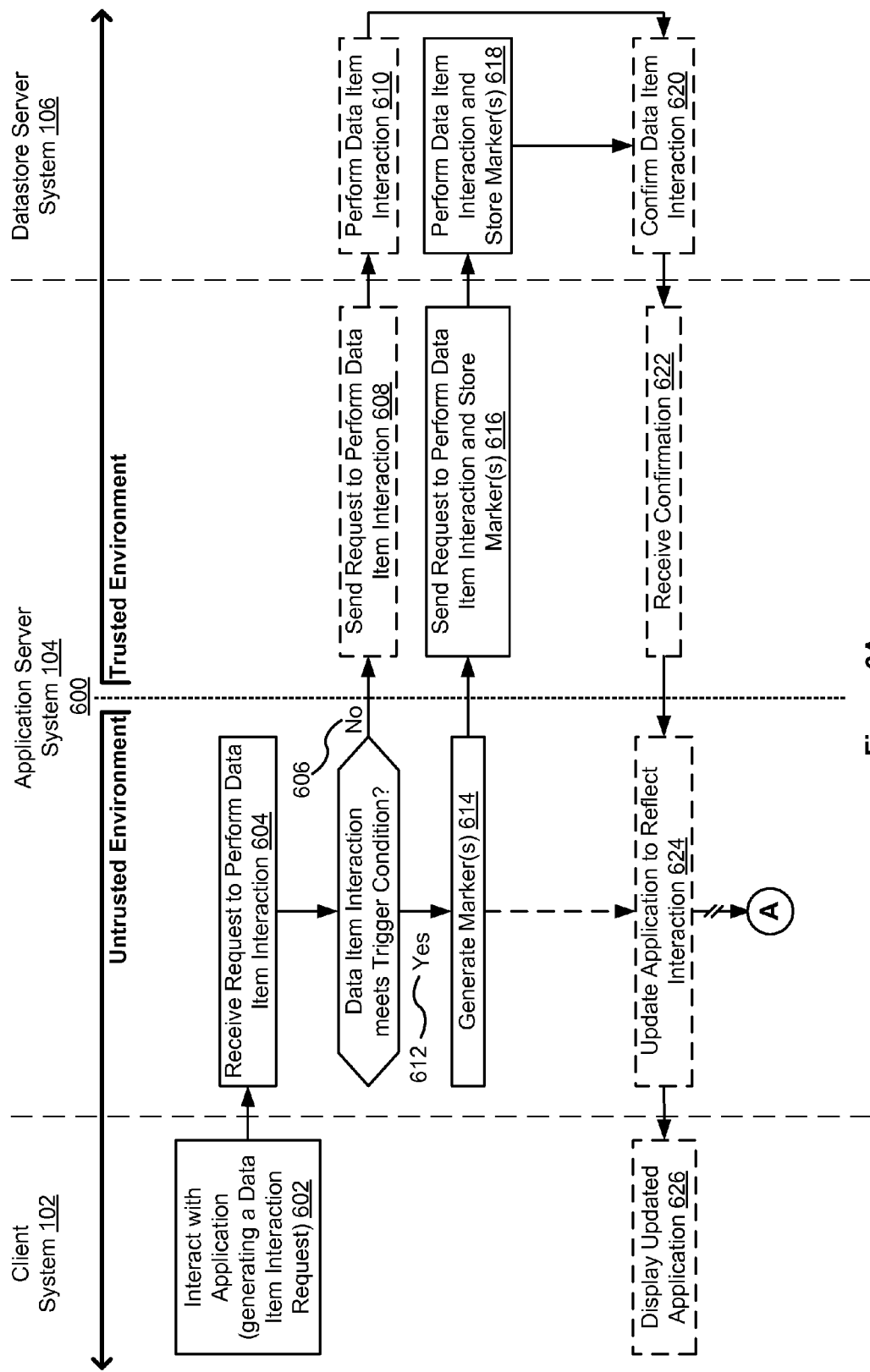
FIGS. 6A-6B include a flow chart illustrating a method for processing data triggers in a system that includes a trusted environment and an untrusted environment, in accordance with some embodiments.
Figure 6B:
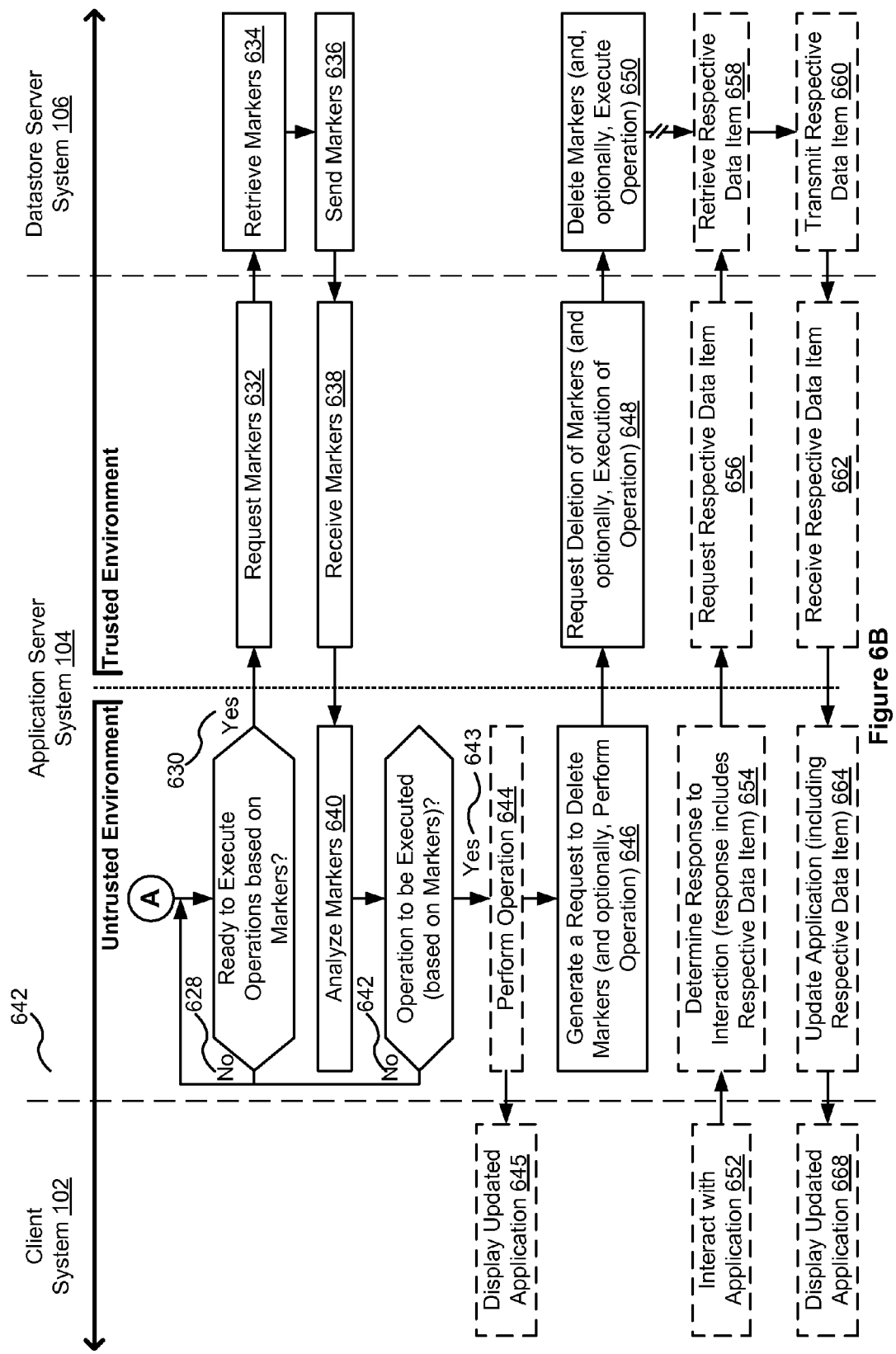
Figure 7A:
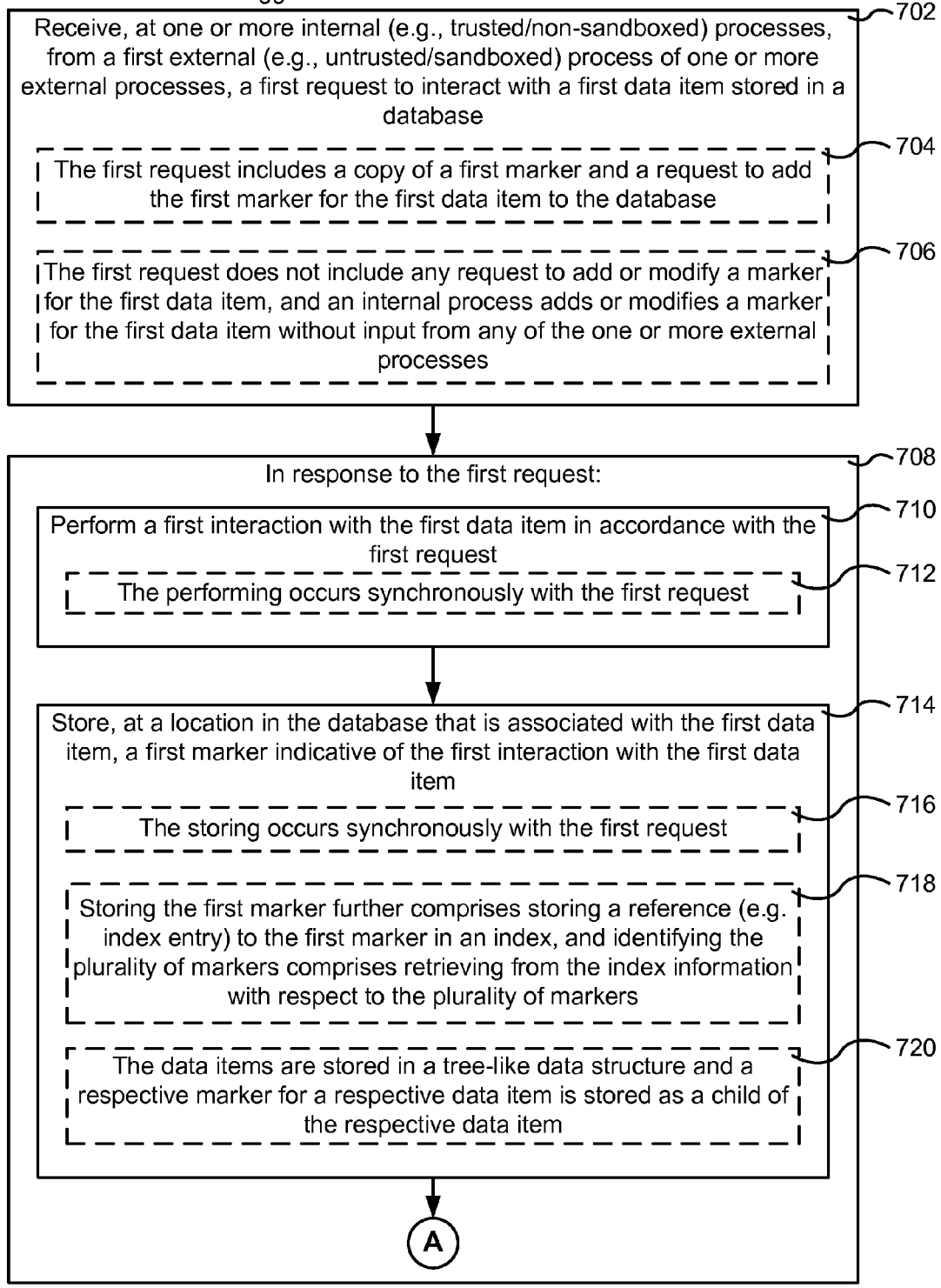
FIGS. 7A-7E include a flow chart illustrating a method for storing information in a trusted environment for use in processing data triggers in an untrusted environment, in accordance with some embodiments.
Figure 7B:
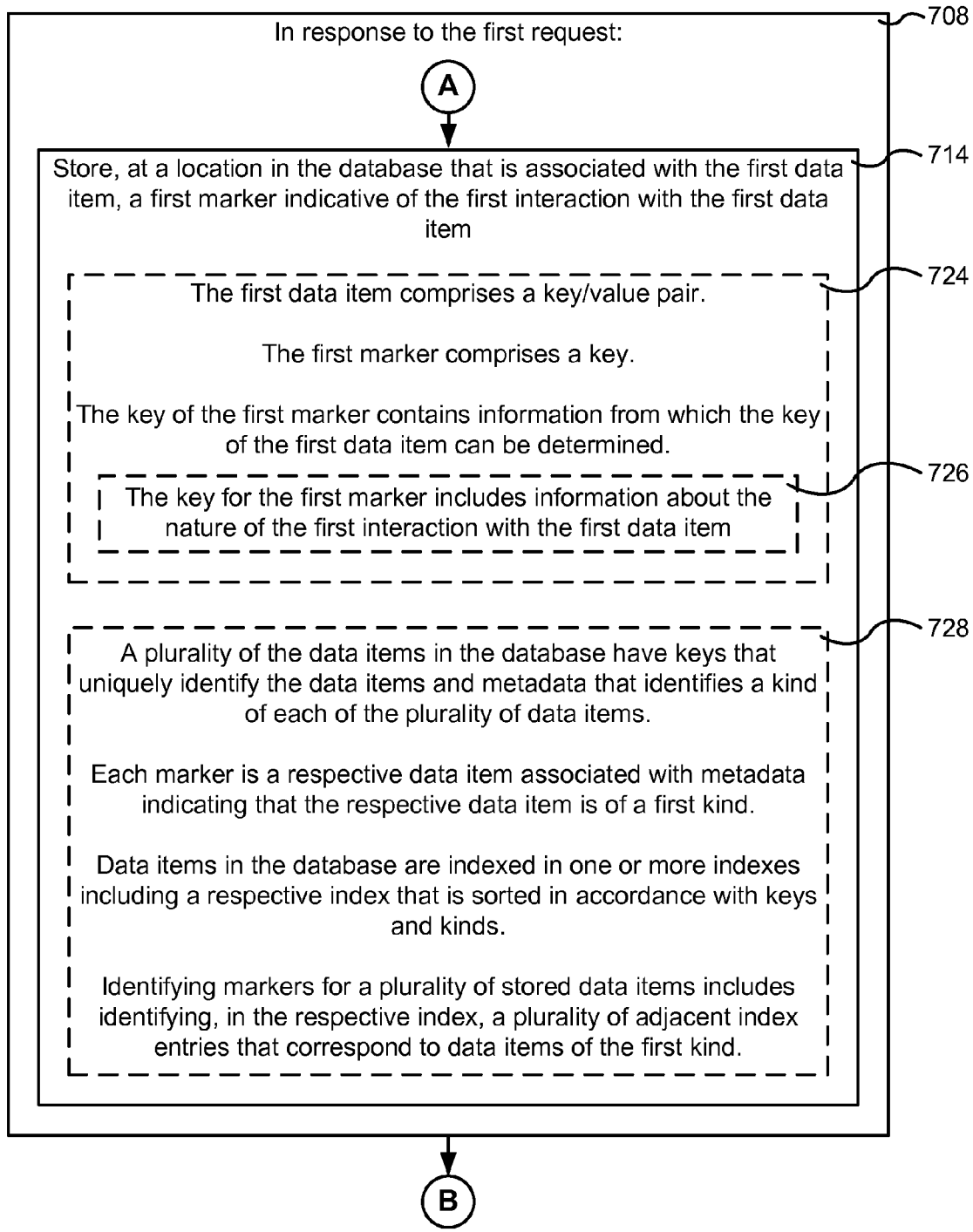
Figure 7C:
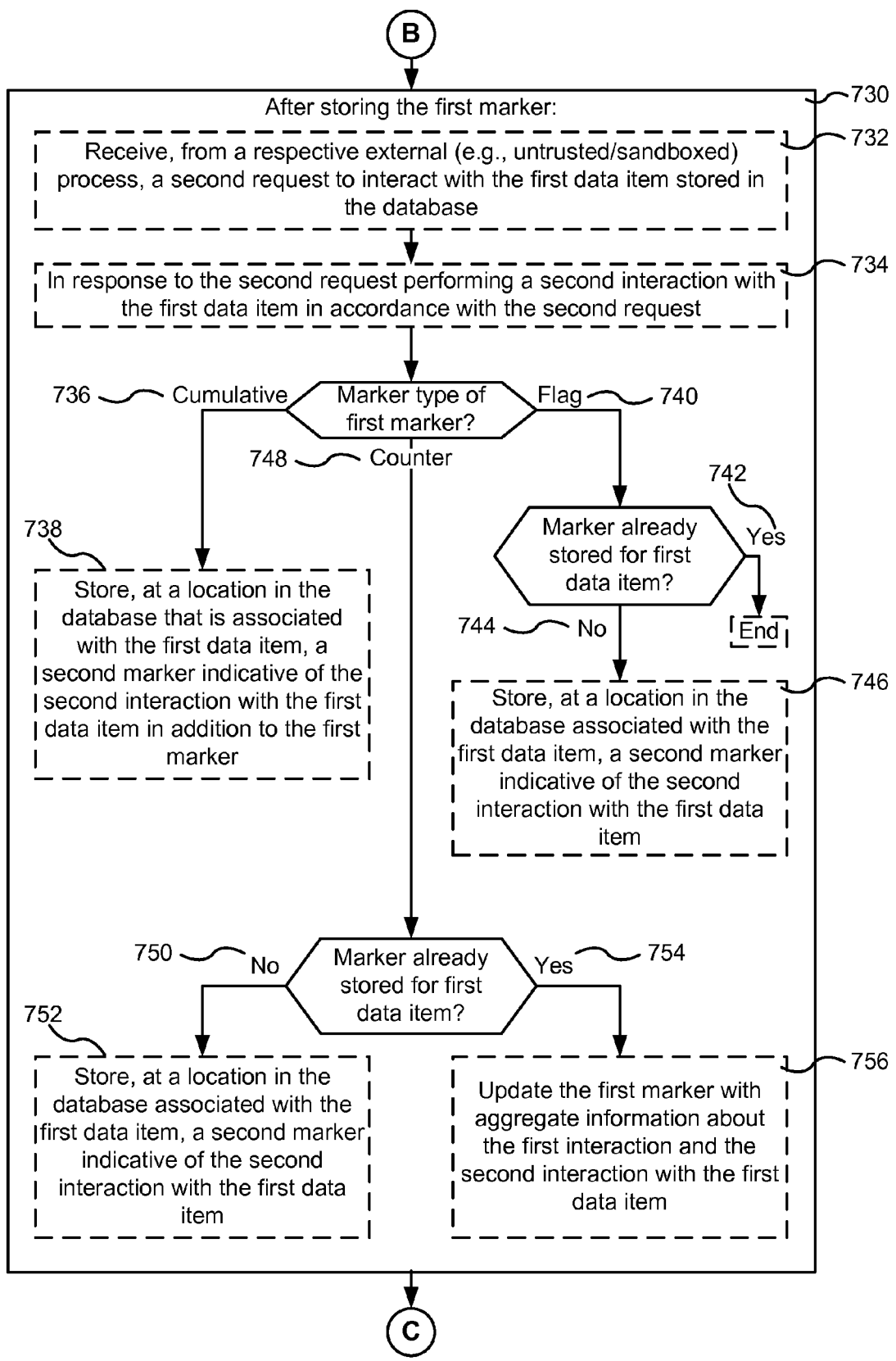
Figure 7D:
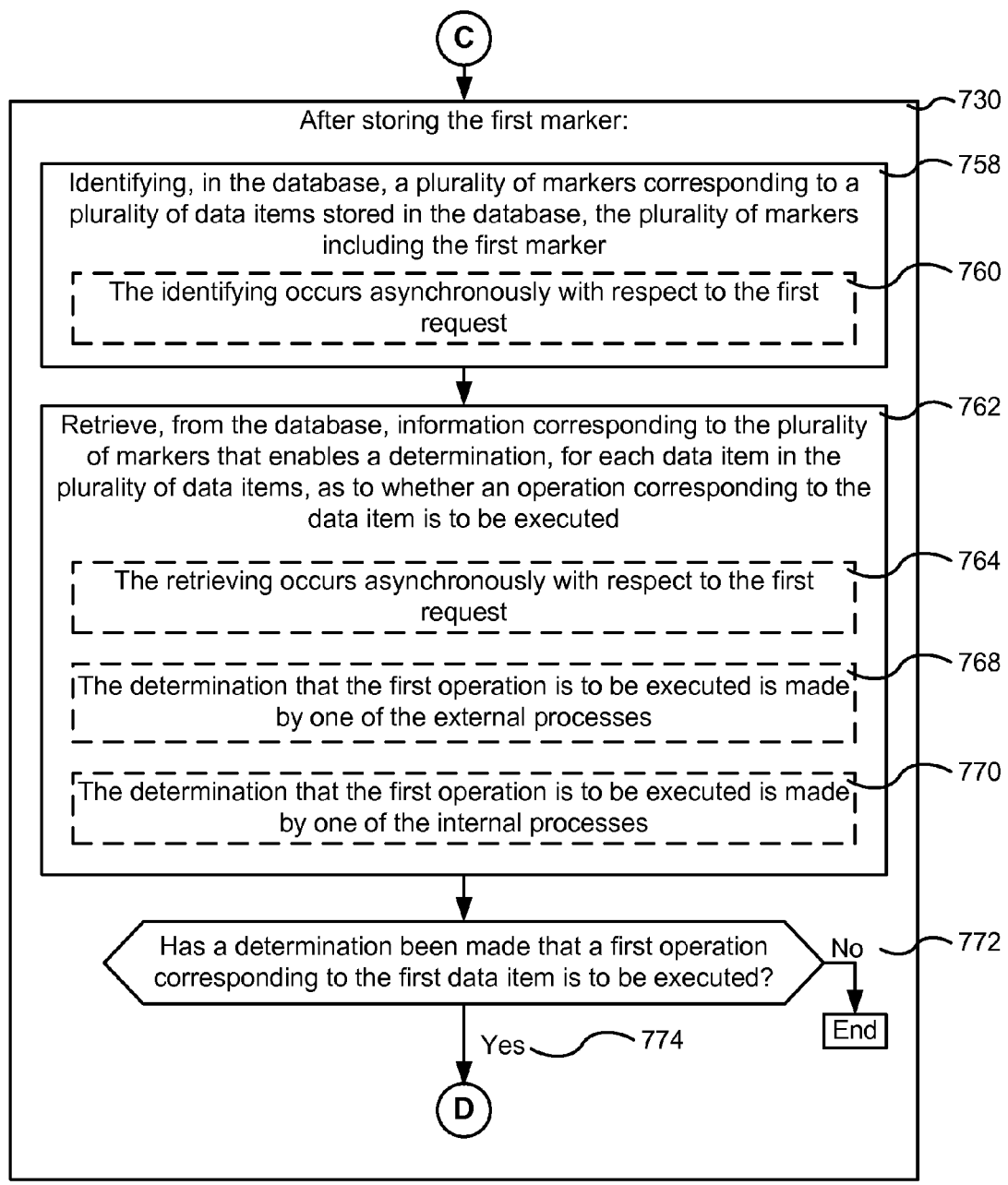
Figure 7E:
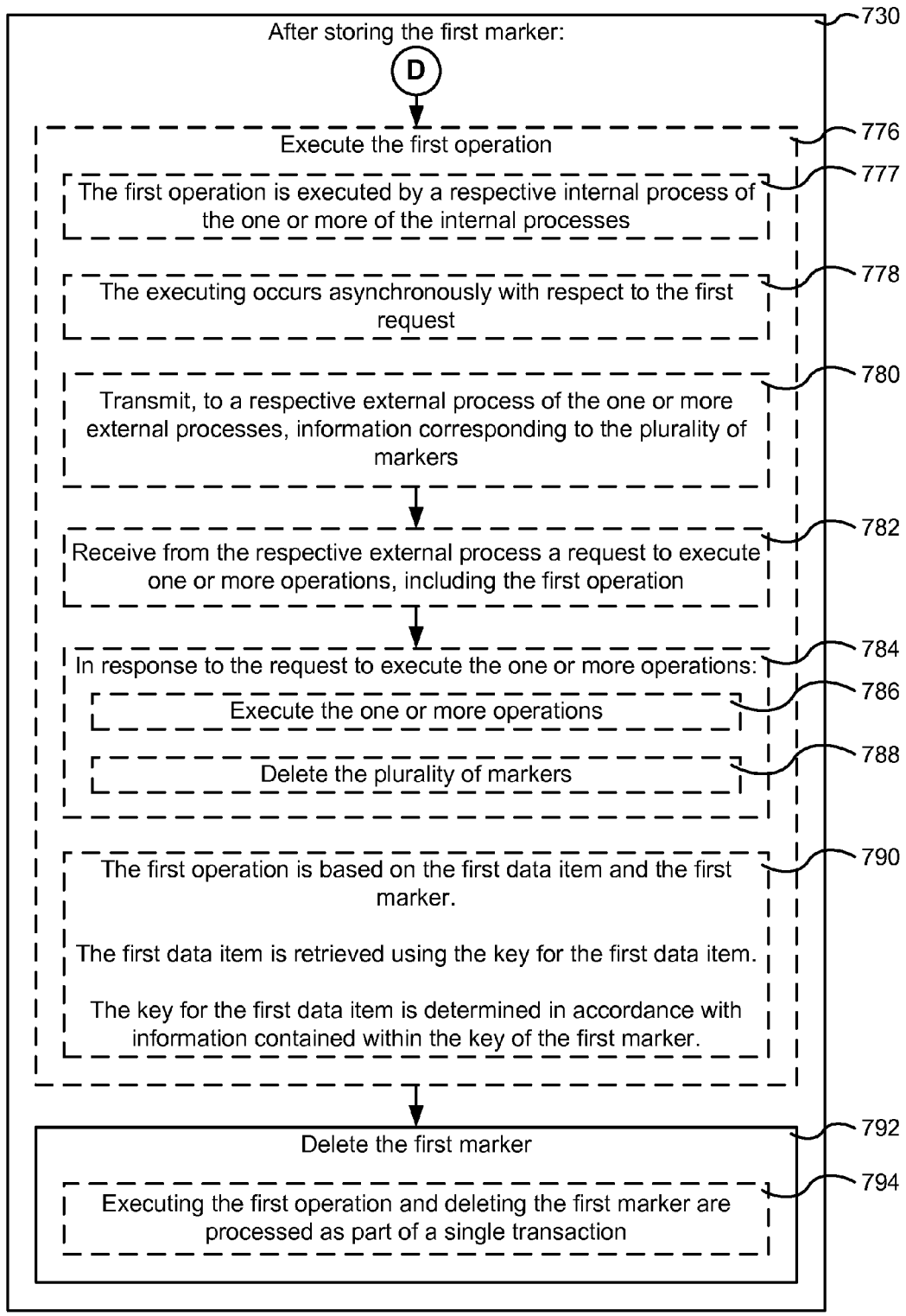
Figure 8A:
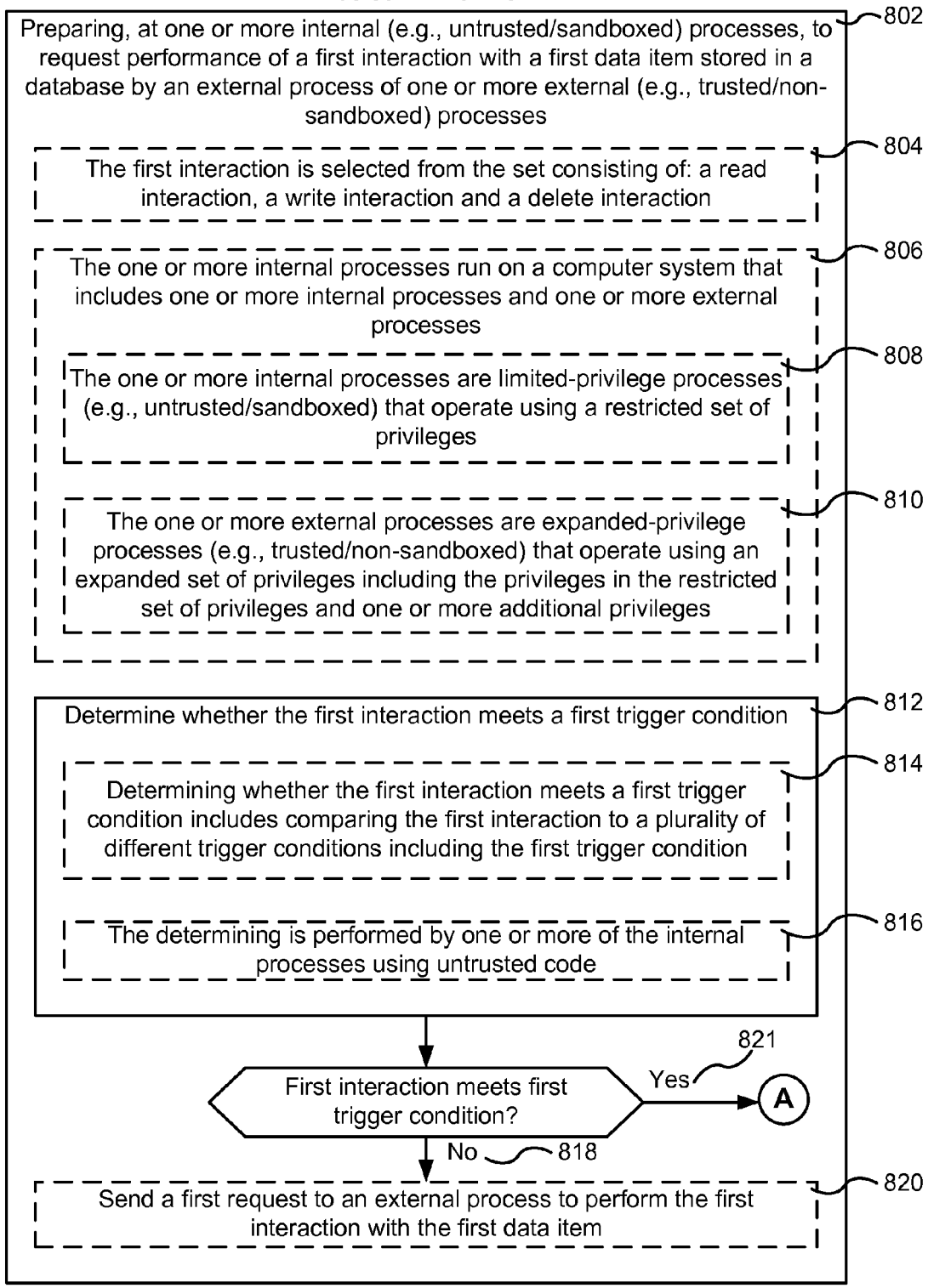
FIGS. 8A-8E include a flow chart illustrating a method for processing data triggers in an untrusted environment based on information stored in a trusted environment, in accordance with some embodiments.
Figure 8B:
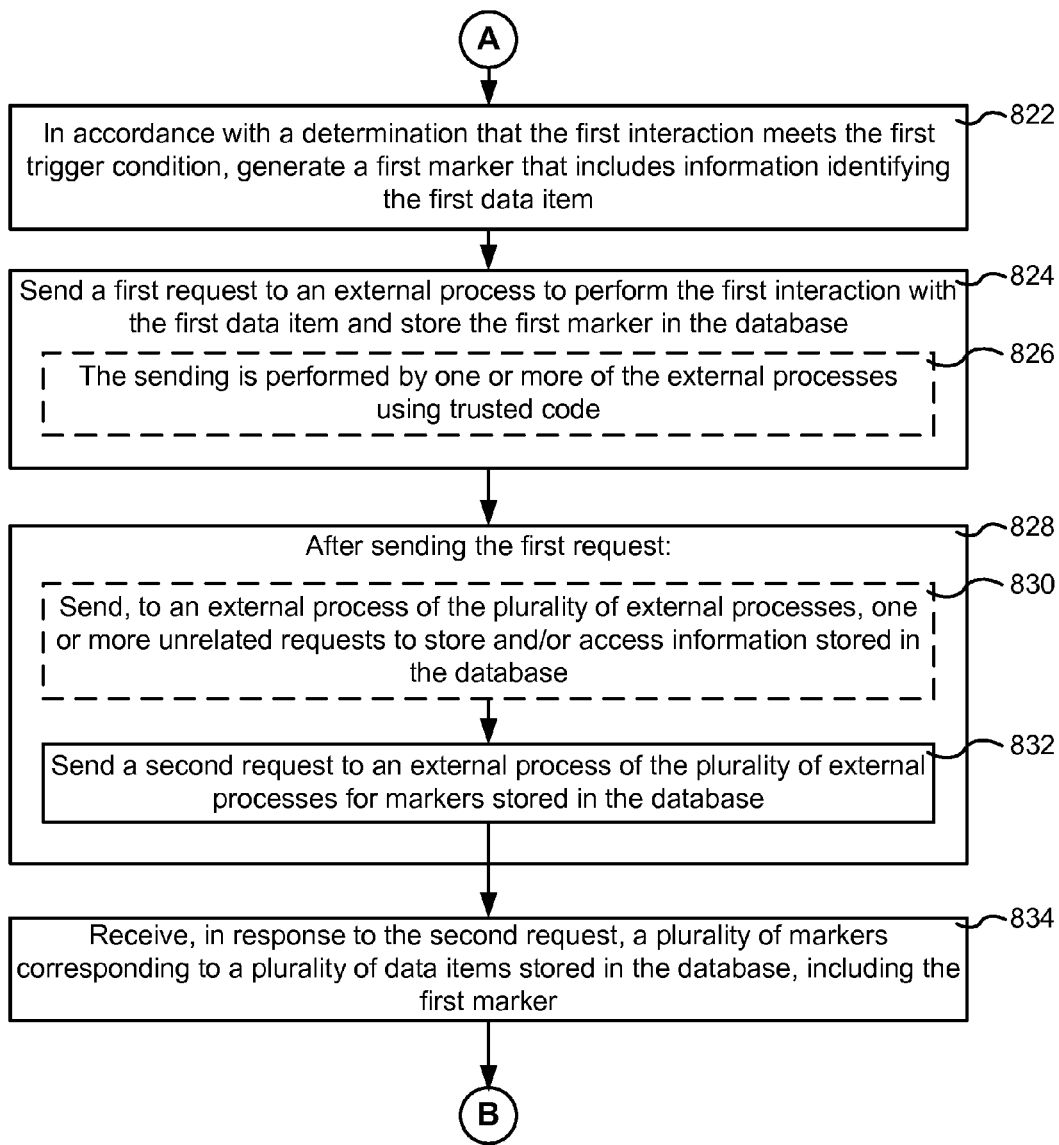
Figure 8C:
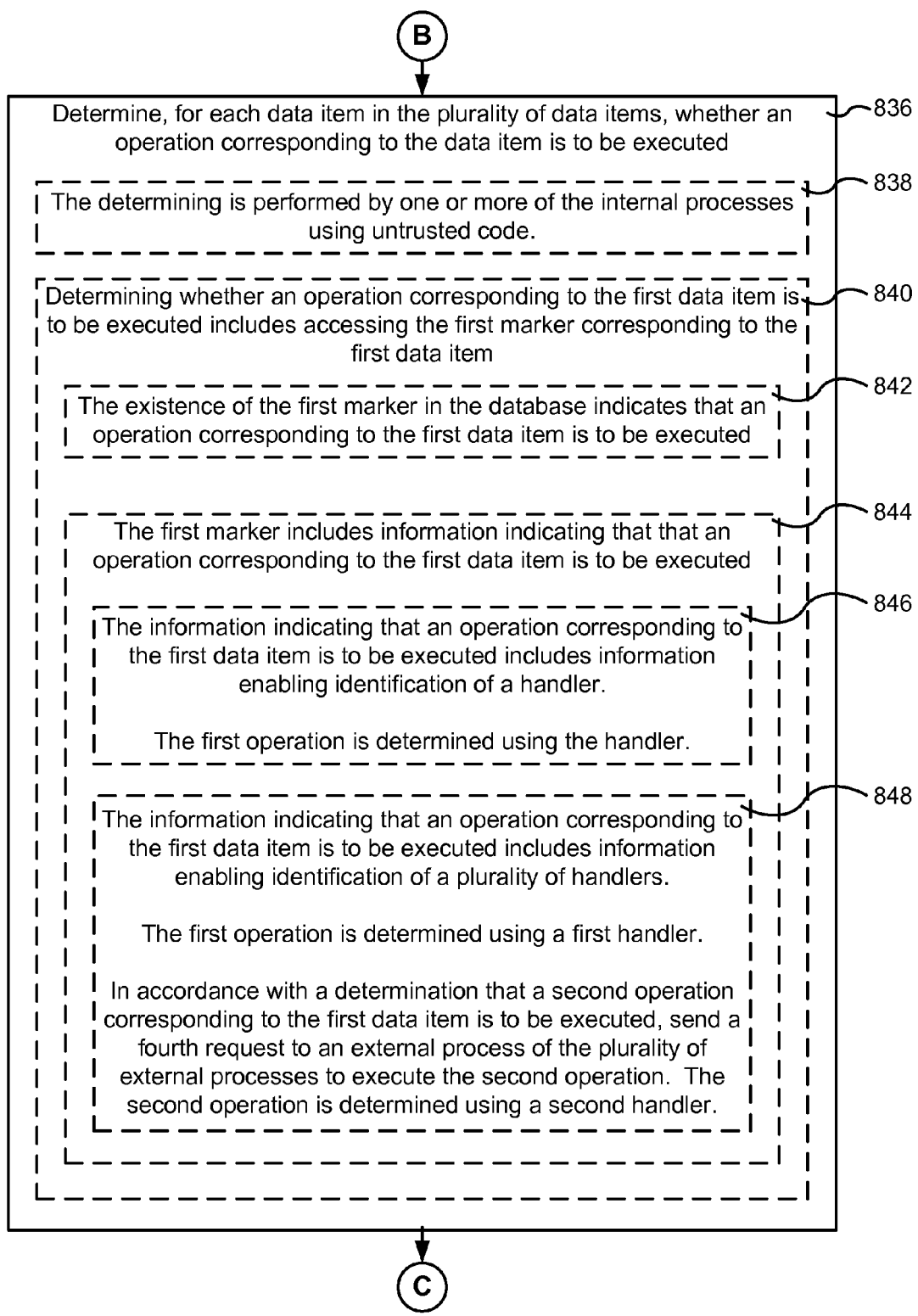
Figure 8D:
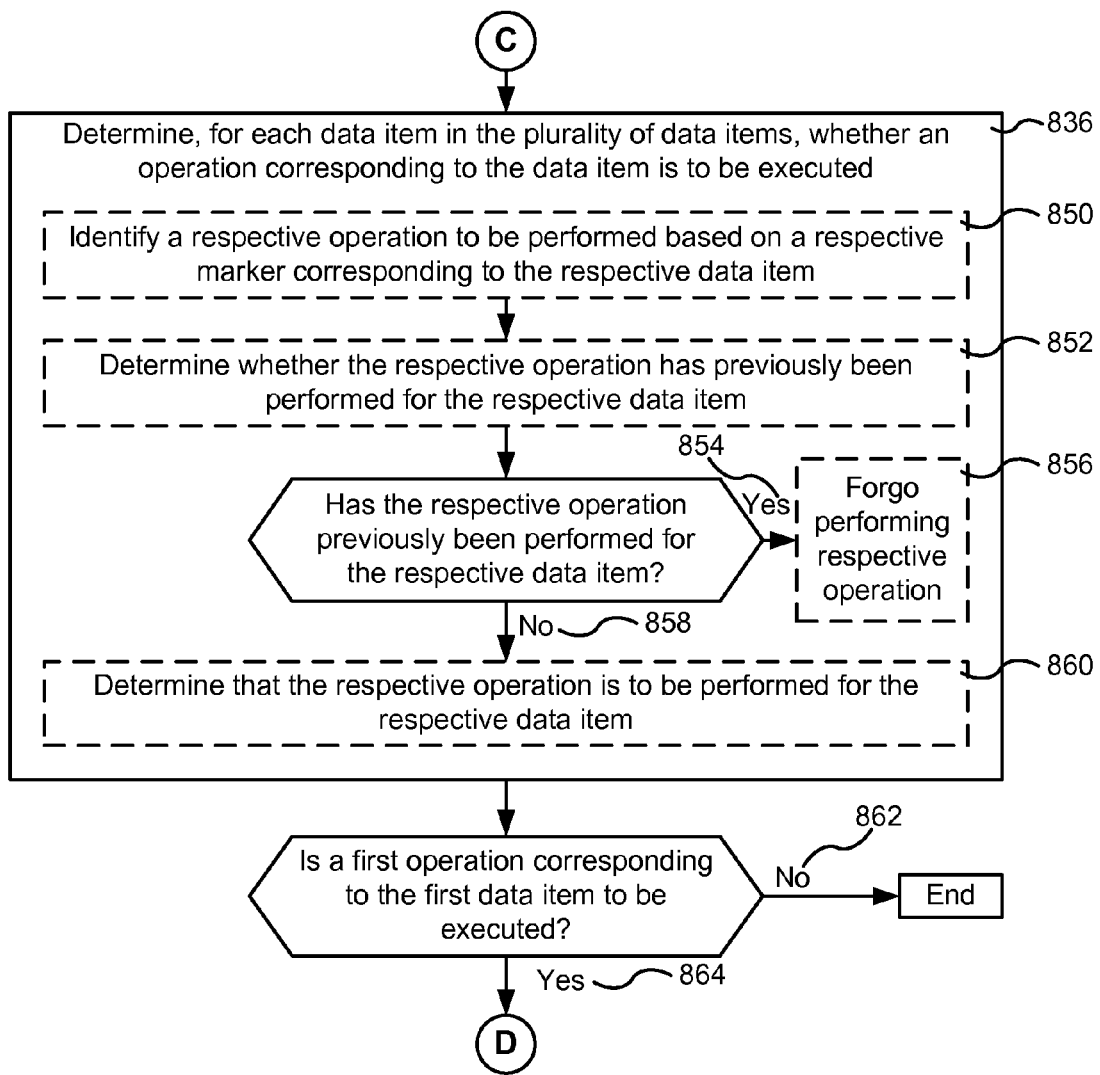
Figure 8E:
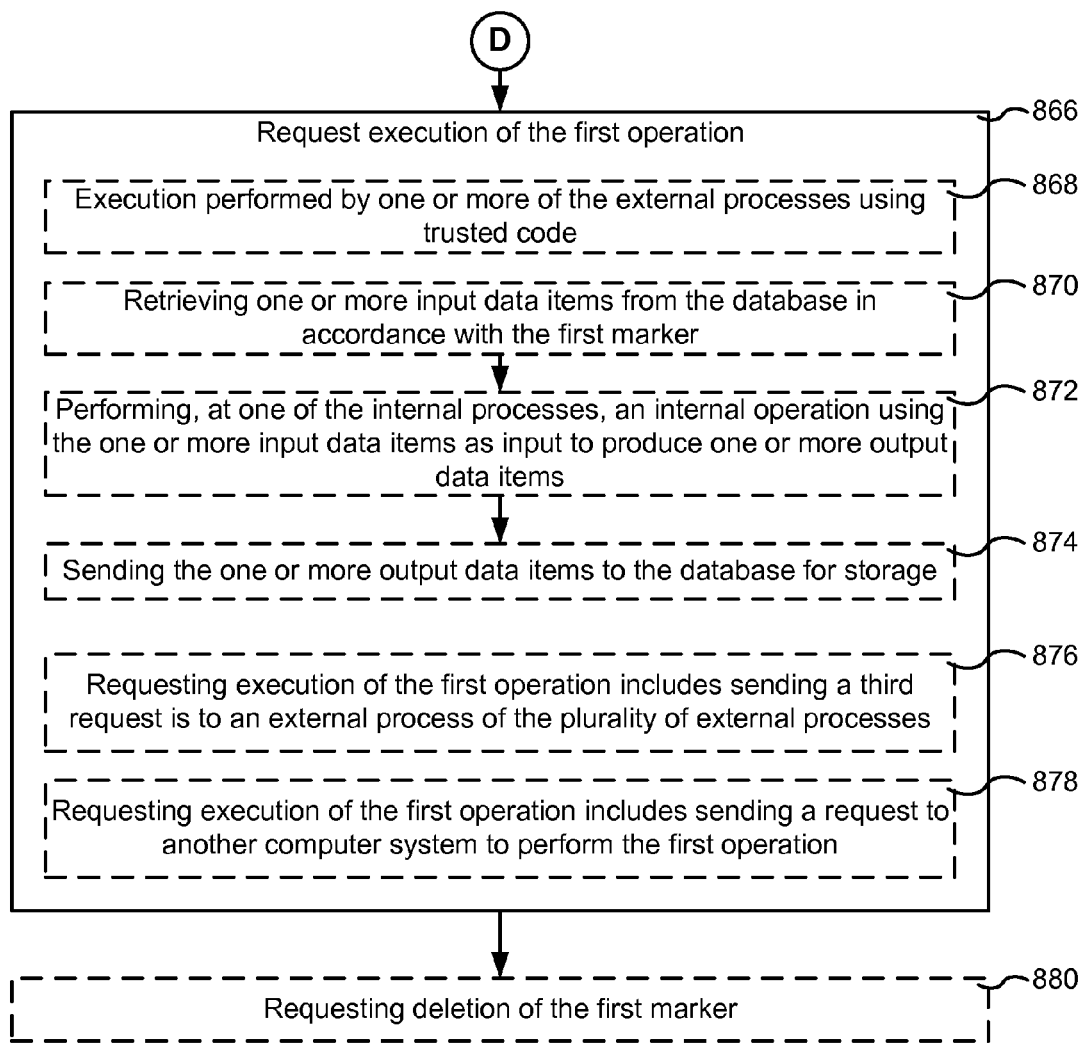

FIGS. 6A-6B include a flowchart representing a method 600 for processing data triggers in a system that includes a trusted environment and an untrusted environment, according to certain embodiments. Method 600 is, optionally, governed by instructions that are stored in a non-transitory computer readable storage medium and that are executed by one or more processors of one or more servers (e.g., Client 102, App Server 104 and/or Data Server 106 as shown in FIGS. 1-4). Each of the operations shown in FIG. 6 typically corresponds to instructions stored in a computer memory or non-transitory computer readable storage medium (e.g., memory 206 of Client 102, memory 306 of App Server 104 and/or memory 406 of Data Server 106 in FIGS. 2-4). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in method 600 may be combined and/or the order of some operations may be changed from the order shown in FIGS. 6A-6B.

Client 102 interacts (602) with an application and generates a data item interaction request. The data item interaction request could be any of a large number of interactions with data items that include viewing data items, modifying data items, adding data items or deleting data items. For example, if the application is displaying an email inbox, the user may request that a label be added to a message or that a message be deleted from the inbox. As another example, a user may request that a user status be updated (e.g., to "Making lunch plans . . . " as shown in FIG. 5D). The application then generates a data item interaction request that requests that user status be updated. App Server 104 (or an untrusted application within an untrusted environment in App Server 104) receives (604) the request to perform data item interaction (e.g., the request to update the user status).

The untrusted application in the untrusted environment of the App Server 104 determines whether the data item interaction meets a trigger condition. Trigger conditions generally correspond to situations where performing the data item interaction affects other data items in the application. For example, when the application keeps track of the last time that the user's status was updated (e.g., so as to provide some indication of whether the user is actively using the application), an update to the user's status will match a data trigger to update a "time of last user status update" timestamp to reflect the most recent time at which the user's status was changed. While this is a very simple example, in principle any interaction with a data item could trigger any of a large number of different operations that affect one or more data items within the application or in other applications. In accordance with a determination that the data item interaction does not (606) meet any trigger condition, the untrusted application in the untrusted environment requests performance of the data item interaction without the need to store any markers, the trusted environment generates and sends (608) a request to perform data item interaction to a Data Server 106, and the Data Server 106 performs (610) the data item interaction.

However, in accordance with a determination that the data item interaction does (612) meet a trigger condition, the untrusted application in the untrusted environment generates (614) one or more markers corresponding to the data item interaction and subsequently requests performance of the data item interaction and storage of the one or more markers at Data Server 106. The trusted environment generates and sends (614) a request to perform data item interaction and store the one or more markers to Data Server 106, and the Data Server 106 performs (618) the data item interaction and stores the markers. In some embodiments, the data item interaction and the markers are stored as part of an atomic transaction to ensure that when a data item is changed it is accompanied by markers that indicate that the data item has changed.

In some embodiments, Data Server 106 sends (620) a confirmation that the data item interaction has been performed. The trusted portion of App Server 104 receives (622) the confirmation that the data item interaction has been performed and informs the untrusted application in the untrusted portion of App Server 104. In some embodiments, the untrusted application waits until confirmation that the data item interaction has been performed before updating (624) the application to reflect interaction. In other embodiments, the untrusted application optimistically updates the application to reflect the interaction without waiting to receive confirmation that the data item interaction has been performed. For example, if the data item interaction is updating a user's status, the update to the application includes replacing display of the previous user status with the new user status. Client 102 displays (626) the updated application. In situations where the data item interaction request was to view a particular data item, displaying the updated application includes displaying a view of the particular data item.

At some later point in time, after the data item interaction has been performed and the one or more markers have been stored, the untrusted application in the untrusted portion of App Server 104 determines whether it is ready to execute operations based on the stored markers. Executing operations based on stored markers may be performed on a predefined schedule and/or when the untrusted application on the untrusted portion of the App Server 104 determines that it has available computing resources to perform operations based on the markers (e.g., during off-peak usage times). In accordance with a determination that the untrusted application is not (628) ready to execute operations based on the markers, the untrusted application waits until a predefined scheduled time to execute the operations or until computing resources are available.

In accordance with a determination that the untrusted application is (630) ready to execute operations based on the markers, the untrusted application indicates that markers are to be retrieved and the trusted portion of App Server 104 requests (632) markers from Data Server 106. For example, the untrusted application may request all markers associated with the application or may request markers for particular types of data items (e.g., markers for user status changes can be retrieved if the untrusted application is currently updating information about user status changes) or particular ranges of values (e.g., markers generated within the last hour). Data Server 106 receives the request, retrieves (634) markers from the entity database and sends (636) the markers to App Server 104. The trusted portion of App Server 104 receives (638) the markers and provides the markers to the untrusted application for analysis. The untrusted application analyzes (640) the markers and uses one more marker handlers to determine, based on the markers, whether any operations are to be executed. It should be understood that many data item interactions may have been performed (and corresponding markers stored) since the last time that operations based on the stored marker were performed. Thus, the operations to be performed could relate to both the markers stored in response to the previous data item interaction as well as one or more additional markers that correspond to other data item interactions performed by the same client or by different clients.

In accordance with a determination that there are not (642) any operations that are to be executed based on the markers, untrusted application optionally instructs Data Server 106 to delete the markers and waits for more markers to be stored before repeating the request for markers from Data Server 106. In accordance with a determination that an operation is (643) to be executed based on the markers, the untrusted application determines the nature of the operation (e.g., the triggered operation triggered by the markers). In some situations, the triggered operation is an operation to be performed outside of the trusted environment (e.g., an operation that does not affect data stored at Data Server 106), and the untrusted application performs (644) the operation, or instructs another computer system in the untrusted environment to perform the operation. Optionally, after the operation is performed, Client 102 (or another client) displays (645) an updated application corresponding to the operation. As one example, the triggered operation includes sending an email from the untrusted environment to Client 102 or another computer system. As another example, the triggered operation includes updating a message delivery service (e.g., via XMPP, Extensible Messaging and Presence Protocol) so as to push an update message to one or more client computers. Using the example described above with reference to FIGS. 5C-5H, when a user's status has been updated, the untrusted application determines whether any of the user's contacts are currently using a computer displaying a status feed corresponding to the user's status updates and sends an update message to those computers to indicate that the user's status has been updated. This update message optionally includes information (e.g., content of the status update and a timestamp) that enables a computer receiving the update message to update the displayed status feed to show the user's updated status.

In some situations the operation is an operation to be executed within the trusted environment (e.g., an operation that affects data stored at Data Server 106), and the untrusted application transmits a request to Data Server 106 to execute the operation in addition to deleting the markers. Thus, the untrusted application generates (646) a request to delete the marker(s) corresponding to the operation which, optionally, includes a request that the operation be executed at Data Server 106. In some implementations, the untrusted application will wait to send a request to delete markers until it confirms that the operation has been performed. After obtaining the information related to the operation (e.g., a request to perform a triggered operation and/or delete markers) the trusted portion of App Server 104 requests (648) deletion of the marker(s) corresponding to the operation and, optionally, requests that the operation be executed at Data Server 106 (e.g., when the operation is an operation that affects data stored in Data Server 106).

As part of an atomic transaction, Data Server 106 deletes (650) the markers and performs the corresponding operation (if any) on a respective data item. For example, when a particular marker was stored in response to updating a user's status, the Data Server 106 updates a counter that represents the number of changes to the user's status in a predefined time period and deletes the marker associated with the update to the user's status (e.g., as shown in FIG. 5G above). It should be understood that in some situations a marker will result in more than one operation (e.g., multiple data items are updated in accordance with a change in the user's status). Similarly in other situations multiple markers will result in a single operation. For example, when a multiple markers are used to determine a number users' statuses in a group of users that have been updated within a predefined time period, a count value corresponding to the number of users whose status has been updated is stored as a single data item. Alternatively, in situations where corresponding operation was performed outside of the trusted environment (e.g., the operation did not affect data stored at Data Server 106), Data Server 106 deletes the corresponding markers without performing a corresponding operation (e.g., because the untrusted application did not transmit an operation to Data Server 106 to be performed in the trusted environment).

At some point in time after the operation(s) based on the markers have been executed, a client interacts (652) with a client application (e.g., by requesting display of user statuses for a group of users and a count of the number of users in the group whose status has changed). The untrusted application at App Server 104 determines (654) a response to the interaction, where the response includes respective data item (e.g., the data item that includes a count value corresponding to the number of users whose status has been updated). The trusted portion of App Server 104 requests (656) the respective data item from Data Server 106. Data Server 106 retrieves (658) the respective data item and transmits (660) the respective data item to App Server 104. The trusted portion of App Server 104 receives (662) the respective data item and provides the respective data item to the untrusted application in App Server 104, which updates (664) the application using the respective data item and transmits information corresponding to the updated application, enabling Client 102 to display (668) the updated application. Thus, when data item interactions are initially performed at Data Server 106, markers are stored so that the changes can be committed without waiting for operations corresponding to data triggers to run. The operations corresponding to the data triggers are subsequently executed at a later point in time by evaluating the markers and determining from the markers the operations that are to be performed. Once the operations have been performed, the modified data items that were modified based on the operations are available to the untrusted application and the markers can be deleted as the operations corresponding to the markers have been performed. The temporal separation of processing interactions with data items and executing operations associated with data triggers corresponding to the interactions enables the untrusted application to securely and efficiently perform data triggers using the distributed data infrastructure provided by Data Server 106.

It should be understood that the particular order in which the operations in FIG. 6 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 700 and 800 (described herein with respect to FIGS. 7A-7E and 8A-8E, respectively) are also applicable in an analogous manner to method 600 described above with respect to FIGS. 6A-6B. For example, the markers, data items, data structures (databases and indexes) and operations described above with reference to method 600 may have one or more of the characteristics of the various markers, data items, data structures (databases and indexes) and operations described herein with reference to methods 700 and 800. For brevity, these details are not repeated here.

Storing Information in a Trusted Environment

FIGS. 7A-7E include a flowchart representing a method 700 for storing information in a trusted environment for use in processing data triggers in an untrusted environment, according to certain embodiments. Method 700 is, optionally, governed by instructions that are stored in a non-transitory computer readable storage medium and that are executed by one or more processors of one or more servers (e.g., App Server 104 and/or Data Server 106, FIG. 4). Each of the operations shown in FIGS. 7A-7E typically corresponds to instructions stored in a computer memory or non-transitory computer readable storage medium (e.g., memory 306 of App Server 104 or memory 406 of Data Server 106 in FIG. 4). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in method 700 may be combined and/or the order of some operations may be changed from the order shown in FIGS. 7A-7E.

As used in the description of FIGS. 7A-7E, an internal process is a trusted process (e.g., a process running in the trusted environment that includes the trusted portion of App Server 104 or and Data Server 106). In contrast, in the description of FIGS. 7A-7E, an external process is an untrusted process (e.g., a process running in the untrusted environment that includes the untrusted application on the untrusted portion of App Server 104 and Client 102). Untrusted processes are also sometimes referred to as "sandboxed processes."

One of the internal (e.g., trusted) processes receives (702), from a first external (e.g., untrusted) process of one or more external processes, a first request to interact with a first data item stored in a database. In some embodiments, the first request includes (704) a copy of a first marker and a request to add the first marker for the first data item to the database. In other words, in these embodiments, a marker indicative of the data item interaction is generated by an untrusted process, such as the untrusted application. In some embodiments, the first request does not include (706) any request to add or modify a marker for the first data item, and an internal process adds or modifies a marker for the first data item without input from any of the one or more external processes. In other words, in these embodiments, the marker is generated by a trusted process based on the changes to the data item interactions specified by untrusted processes (e.g., the marker is an internal bookkeeping device that the untrusted application does not need to be aware of to function properly).

In various embodiments one or more of operations 710-728 are performed (708) in response to the first request. One of the internal processes performs (710) a first interaction with the first data item in accordance with the first request (e.g., performing an operation associated with a read and/or write request, such as changing a user's status to "Making lunch plans . . . "). In some embodiments, the performing occurs (712) synchronously with the first request. In other words, the internal process attempts to minimize any delay between receiving the first request and performing the operation specified by the request, so as to reduce any appearance of latency in processing the interaction.

One of the internal processes stores (714), at a location in the database that is associated with the first data item, a first marker indicative of the first interaction with the first data item (e.g., a marker received from one of the external processes or a marker generated by one of the internal processes). In some embodiments, the storing also includes indexing the marker in an index corresponding to the database. In some implementations performing the interaction and storing the first marker are performed as part of the same atomic transaction and thus the storing occurs (716) synchronously with the first request. In some embodiments, storing the first marker further comprises storing (718) a reference to the first marker in an index (e.g. index entry corresponding to the first marker), and identifying the plurality of markers comprises retrieving from the index information with respect to the plurality of markers.

Thus, in these embodiments, in order to identify the markers, an internal process can simply perform a query to retrieve from the index database keys corresponding to markers in the database (e.g., entities having Kind=marker"). In some implementations, the marker entries are stored in the same index, or the same set of indexes, used to index data items in the entity database. For example, as shown in FIG. 5B, Index C 144-C is sorted by kind, so that an index that includes data items and markers includes a separate index portion that includes a plurality of consecutive index entries for markers. By storing an index sorted by kind, index entries for markers can be quickly identified by retrieving a set of one or more index entries from the Kind=marker portion of an index (e.g., Index C 144-C in FIG. 5B). Additionally, storing both the marker and the data items in the same data structures (e.g., the entity database and associated indexes) dramatically reduces the cost of storing the marker when performing the data item interaction, as both the data item and the marker are stored in the same set of data structures. In particular, the cost to access and, optionally, modify the data item in accordance with the data item interaction is already being incurred when the data item interaction is performed, thus there is little or no additional cost associated with accessing the same data structures to add a marker indicative of the interaction of the data item to the same set of data structures.

In some embodiments, the data items are stored (720) in a tree-like data structure and a respective marker for a respective data item is stored as a child of the respective data item, as described in greater detail above with reference to FIGS. 5C-5G. In some embodiments, the first data item comprises (724) a key/value pair, the first marker comprises a key (and, optionally, a corresponding value) and the key of the first marker contains information from which the key of the first data item can be determined (e.g., the key for a child includes the key and type of its parent, etc., so that the key of a data item includes information indicating the key/type of all parent data items, as illustrated in FIGS. 5C-5G). In some embodiments, the value of the key/value pair includes one or more metadata components and/or content associated with the entity. Additionally, in some of these embodiments, the key for the first marker includes (726) information about the nature of the first interaction with the first data item (e.g., whether the first interaction was a read interaction, a write interaction, an add interaction or a delete interaction, etc.). When information about the nature of the first interaction is stored in the key, the system is saved from incurring the cost of actually looking up the value associated with the key, because an internal or external process can evaluate the information contained in the marker key to determine whether an operation corresponding to the marker is to be performed without requiring the value (if any) associated with the marker to be retrieved. Alternatively or in addition, in some implementations the marker includes a value associated with the key that stores information about the first interaction (e.g., whether the first interaction was a read interaction, a write interaction, an add interaction or a delete interaction, etc.).

In some embodiments, a plurality of the data items in the database have (728) keys that uniquely identify the data items and metadata that identifies a kind of each of the plurality of data items and each marker is a respective data item associated with metadata indicating that the respective data item is of a first kind. In some of these embodiments, data items in the database are indexed in one or more indexes including a respective index that is sorted in accordance with keys and kinds; and identifying markers for a plurality of stored data items includes identifying, in the respective index, a plurality of adjacent index entries that correspond to data items of the first kind. After the marker have been stored in the database, the markers are available for later use in determining whether or not to execute additional operations based on the interactions that have been performed with the data items. For example, as shown in FIGS. 5A-5B the markers have a metadata component indicating that they have Kind=marker.

In various embodiments one or more of operations 732-794 are performed (730) after storing the first marker. In some circumstances, after storing the first marker for the first data item additional data item interactions will occur that affect the first data item. It should be understood that there are many different approaches to using markers to indicate additional data item interactions with a data item (e.g., the first data item) that already has a marker stored indicating a prior interaction that affected the data item, a subset of which are described in greater detail below.

In one implementation, one or more of the markers are "cumulative markers" and thus when one or more additional interactions are performed that affect the same data item one or more additional markers are stored so that each of these interactions with the data item causes a new marker to be generated that is indicative of the interaction that caused the marker to be stored. Such cumulative markers are particularly useful in situations where a later performed operation takes a history of changes to the data item as an input. For example, when tracking edits to a document by different users, a program may want to display information corresponding to what changes were made and the user that made the changes.

In another implementation one or more of the markers are "flag markers," where the presence of a marker associated with a data item indicates that the data item has been modified and the absence of a marker associated with the data item indicates that the data item has not been modified (or has not been modified in a way that triggers any data triggers). Thus, if there is already a marker associated with a data item when another interaction is performed with the data item, an additional marker does not need to be stored for the data item, as the original marker already indicates that the data item was modified. In some situations the time of the last change to a data item matters and thus the original marker would be replaced with a new marker that has a more recent timestamp. However, there is typically only one flag marker that is associated with a data item at any particular time. Such flag markers are particularly useful in situations where data items are interacted with frequently but only the last interaction or the time of the last interaction is used to modify other data items. For example, in a situation where a time since a webpage was last accessed is being tracked, each time the webpage is viewed, a marker can be stored associated with the webpage that indicates that the webpage was accessed at a particular time. However, in this example if a marker is already present, the old marker can be replaced with a new marker with a new timestamp, as the new timestamp corresponds to the time when the webpage was last accessed.

In another implementation, one or more of the markers are "counter markers," where the marker includes an indicator of a number of interactions have been performed for a particular data item. Thus, if there is already a marker associated with the particular data item when another interaction is performed with the data item, the counter of the marker can be incremented to indicate that an additional interaction has been performed. Such counter markers are particularly useful in situations where data items are interacted with frequently but only the number of interactions is used to modify other data items. For example, when counting document views or revisions, the number of interactions that have been performed is the most relevant information, which can be collected by incrementing a counter value in the marker each time a new marker would otherwise have been stored. While "cumulative markers," "flag markers" and "counter markers" have been described above as separate types of markers, it should be understood that these different marker types could be used separately or in conjunction with each other or in combination with additional types of markers to track interactions with data items in the entity database.

In some embodiments, after receiving the first request and prior to executing the first operation: one of the internal processes receives (732), from a respective external (e.g., untrusted/sandboxed) process, a second request to interact with the first data item stored in the database. In response to the second request one of the internal processes performs (734) a second interaction with the first data item in accordance with the second request. It should be understood that the second interaction could be any of: a read interaction, a write interaction, an add interaction or a delete interaction. In accordance with a determination that the marker is to be a cumulative (736) marker, one of the internal processes stores (738), at a location in the database that is associated with the first data item, a second marker indicative of the second interaction with the first data item in addition to the first marker. In some embodiments, the storing also includes indexing the second marker in an index corresponding to the database. As described above, using cumulative markers is particularly useful when storing multiple revisions to a data item so as to enable reversion to an earlier version of the data item.

In some embodiments, after receiving the first request one of the internal processes receives (732), from a respective external (e.g., untrusted/sandboxed) process, a second request to interact with the first data item stored in the entity database. In response to the second request one of the internal processes performs (734) a second interaction with the first data item in accordance with the second request (e.g., performing a read interaction, a write interaction, an add interaction or a delete interaction, etc.). In accordance with at determination that the marker is to be a flag (740) marker, one of the internal processes determines whether there is already a marker stored for the first data item. In accordance with a determination that there is already a marker (e.g., the first marker) stored (742) at a location in the database that is associated with the first data item, the internal process foregoes storage, in the database, of a second marker indicative of the second interaction with the first data item and the process ends, as the first data item has already been flagged as having been changed. As described above, using flag markers is particularly useful when the marker is to determine whether or a data item has changed since the last backup, etc. (e.g., only showing that a change has been made to a document without indicating how many changes have been made). However, in accordance with a determination that no markers associated with the first data item are stored in the database, one of the internal processes stores (746), at a location in the database associated with the first data item, a second marker indicative of the second interaction with the first data item. In some embodiments, the storing also includes indexing the marker in an index corresponding to the database.

In some embodiments, after storing the first marker one of the internal processes receives (732), from a respective external (e.g., untrusted/sandboxed) process, a second request to interact with the first data item stored in the database. In response to the second request one of the internal processes performs (734) a second interaction with the first data item in accordance with the second request (e.g., performing a read interaction, a write interaction, an add interaction or a delete interaction, etc.). In accordance with at determination that the marker is to be a counter (748) marker, one of the internal processes determines whether there is already a marker stored for the first data item. It should be noted that even though the first marker was stored previously for the first data item, the first marker may have been deleted for various reasons (e.g., one or more operations associated with data triggers for the first marker have already been performed), and thus even if the first marker was already stored, one or more of the internal processes may check to determined whether or not the first marker associated with the first data item still exists. In accordance with a determination that no markers associated with the first data item are stored (750) in the database, one of the internal processes stores (752), at a location in the database associated with the first data item, a second marker indicative of the second interaction with the first data item. In some embodiments, the storing also includes indexing the marker in an index corresponding to the database. However, in accordance with a determination that the first marker is stored (754) at a location in the database that is associated with the first data item, one of the internal processes updates (756) the first marker with aggregate information about the first interaction and the second interaction with the first data item (e.g., an aggregate count value corresponding to the number of interactions performed with the data item since a last time that operations corresponding to data triggers were performed). It should be understood that, as used herein, "updating" encompasses either: deleting and replacing, or updating a parameter (e.g., incrementing a counter or other value) in the marker. As described above, using counter markers is particularly useful when the information being tracked includes how frequently or how many times a data item has been read/modified (e.g., the key or value for the marker includes a counter that is incremented by a predefined amount each time the data item is read or modified).

After storing the first marker, one of the internal processes identifies (758), in the database, a plurality of markers corresponding to a plurality of data items stored in the database, the plurality of markers including the first marker. In some embodiments, the identifying occurs (760) asynchronously with respect to the first request. As described above, the plurality of markers may be identified using a sorted index such as index 144-C in FIG. 5B, where entities with Kind=marker are grouped together into a "marker" portion of the sorted index, and thus the markers keys can be retrieved from consecutive index entries in the index. One of the internal processes retrieves (762), from the database, information corresponding to the plurality of markers that enables a determination, for each data item in the plurality of data items, as to whether an operation corresponding to the data item is to be executed. In some embodiments, the retrieved information is a list of keys of markers or the content of modified data items. For example, the presence of a marker for a data item may indicate that a trigger condition has been met for the data item.

In some embodiments, one or more of the markers indicate a type of handler that is to determine the operation in accordance with the corresponding marker and data item. For example, if there is a respective handler that updates count values, in some implementations, a marker will indicate that the marker corresponds to a data item interaction that caused a count for the data item to be increased, and the marker will be provided to the respective handler for processing. In some embodiments, the retrieving occurs (764) asynchronously with respect to the first request. In other words, retrieving the markers occurs as part of a separate atomic transaction from performing the data item interaction and storing the markers, enabling the data item interaction to be completed quickly without being delayed by waiting for operations associated with data triggers to be executed.

In some embodiments, the determination that the first operation is to be executed is made by (768) one of the external processes (e.g., a list of the keys for the markers is sent to the external process and the external process requests data items based on the keys of the markers, receives the data items, determines operations to be executed on the data items and sends instructions to modify the data items or sends modified data items back to an internal process for storage in the database). In some embodiments, the determination that the first operation is to be executed is made by (770) one of the internal processes (e.g., the list of trigger conditions is sent to one of the internal processes by the external process and the internal process checks whether the trigger conditions have been met in accordance with a predetermined schedule).

One of the internal processes determines whether a first operation corresponding to the first data item is to be executed based at least in part on the retrieved markers. In accordance with a determination that no (772) operations corresponding to the first data item are to be executed based on the retrieved markers, the process ends. However, in some embodiments, in accordance with a determination that a first operation corresponding to the first data item is (774) to be executed by one of the internal processes, one of the internal processes executes (776) the first operation. For example if the first marker indicates that a user's status was updated at 12:30 pm, and the data item is a time of last user status update for the user's status, executing the operation includes retrieving the data item and modifying the data item to include information indicating that the time of last user status update is 12:30 pm. It should be understood that the internal process could also execute additional triggers for the same data item and/or for other data items if other datastore trigger conditions are met and/or the first datastore trigger condition is met for the other data items.

In some embodiments, the first operation is executed (777) by a respective internal process of the one or more of the internal processes. In some embodiments, the first operation is executed by one or more of the external processes in the untrusted environment (e.g., the untrusted application or a computer system that is in communication with the untrusted application) Additionally, as described above, in some embodiments, the performing and storing occur synchronously with the first request while the identifying, retrieving and executing occur (778) asynchronously with respect to the first request. Additionally, in some implementations, the performing and/or storing are performed by a first internal process and the identifying, retrieving and/or executing are performed by a second internal process distinct from the first internal process. Furthermore, the identifying, retrieving and/ or executing are typically performed in response to a second request/command from an external process. Performing data item interactions separately from executing operations associated with data triggers enables data item interactions to be performed more quickly thereby reducing the apparent latency of the system in performing the data item interactions, while still allowing complex and time consuming operations to be executed based on data item interactions. Consequently performing data item interactions and storing markers synchronously with a request from an external process and executing operations based on the markers asynchronously with respect to the request improves system performance and/or provides a greater range of possible operations as compared to systems that require that operations based on data item interactions be executed synchronously with the data item interaction.

In some embodiments, executing the first operation includes transmitting (780), to a respective external process of the one or more external processes, information corresponding to the plurality of markers. For example the information corresponding to the plurality of markers may include one or more of keys and/or values for the markers that include an indication of whether operations are to be executed for the markers. After transmitting the information corresponding to the markers to the respective external process, the internal process receives (782), from the respective external process, a request to execute one or more operations, including the first operation. In these embodiments, in response (784) to the request to execute the one or more operations, one of the internal processes executes (786) the one or more operations and, optionally, deletes (788) the plurality of markers. As noted above, in some embodiments the markers and data items are stored in the same set of data structures (e.g., the entity database and associated indexes). In some embodiments, the first operation is based on (790) the first data item and the first marker, the first data item is retrieved using the key for the first data item and the key for the first data item is determined in accordance with information contained within the key of the first marker. In other words, retrieving the first data item to perform the operation on the first data item does not necessarily involve retrieving a value for the marker. Rather, in some implementations, if the key of the first marker includes information from which the key of the first data item can be extracted, the key of the first data item is be extracted and used to retrieve the first data item without ever retrieving the first marker from the database.

In some embodiments, in conjunction with execution of the first operation, one of the internal processes deletes (792) the first marker. In some embodiments, the first marker is deleted after executing the first operation. In some of these embodiments, the execution of the first operation and the deletion of the first marker are processed (794) as part of a single transaction (e.g., so as to prevent collisions from creating inconsistencies in the entity database). In some embodiments, an optimistic concurrency model is used, and if there is a collision between two operations (e.g., two operations attempt to make a change to the same data item at the same time), one of the operations fails and must be performed again. As described above, storing the data items and markers and index entries associated with both data items and markers in the same data structures is helpful when deleting markers, as the data can be read and/or modified in the same transaction that deletes the marker. In addition to the added efficiency of accessing both the data item and the marker at the same time, this collocation of data items and their associated markers also provides advantages for ensuring transactional consistency when an optimistic concurrency model is used. For example, if a transaction includes both performing an operation on a data item and deleting an associated marker, if the transaction succeeds both the operation on the data item and deletion of the marker occur, and if the transaction fails (e.g., due to a collision with another operation), the operation fails and the marker is preserved so that it can be used, at a later time, to determine that the operation still needs to be performed.

In some situations, an operation triggered by the markers is an operation to be performed outside of the trusted environment (e.g., an operation that does not affect data stored at Data Server 106 and thus can be performed by the external processes in the untrusted environment). In some of these situations, the untrusted application performs the operation, or instructs another computer system in the untrusted environment to perform the operation. Thus, in these situations, once the operation triggered by the markers has been performed in the untrusted environment, the untrusted application sends a request to delete one or more of the markers (e.g., so as to indicate that the operations triggered by the markers have been performed) but does not necessarily include instructions to perform additional operations in the trusted environment. Alternatively, in some situations the operation triggered by the markers is an operation to be executed within the trusted environment (e.g., an operation that affects data stored at Data Server 106 and thus is to be processed by internal processes in the trusted environment), and the untrusted application transmits a request to Data Server 106 to execute the operation in addition to deleting the markers. Thus, in these situations, executing the first operation includes performing multiple sub-operations including deleting the markers and performing the operation triggered by the markers. In some implementations, the order in which these two sub-operations are performed does not matter so long as the sub-operations are performed as part of an atomic transaction, so that if one of the sub-operations is performed, both of the sub-operations are performed.

It should be understood that the particular order in which the operations in FIGS. 7A-7E have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 600 and 800 (described herein with respect to FIGS. 6A-6B and 8A-8E, respectively) are also applicable in an analogous manner to method 700 described above with respect to FIGS. 7A-7E. For example, the markers, data items, data structures (databases indexes) and operations described above with reference to method 700 may have one or more of the characteristics of the various markers, data items, data structures (databases and indexes) and operations described herein with reference to methods 600 and 800. For brevity, these details are not repeated here.

Processing Data Triggers in an Untrusted Environment

FIGS. 8A-8E include a flowchart representing a method 800 for processing data triggers in an untrusted environment based on information stored in a trusted environment, according to certain embodiments. Method 800 is, optionally, governed by instructions that are stored in a non-transitory computer readable storage medium and that are executed by one or more processors of one or more servers (e.g., App Server 104, FIG. 3). Each of the operations shown in FIG. 8 typically corresponds to instructions stored in a computer memory or non-transitory computer readable storage medium (e.g., memory 306 of App Server 104 in FIG. 3). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in method 800 may be combined and/or the order of some operations may be changed from the order shown in FIGS. 8A-8E.

As used in the description of FIGS. 8A-8E, an internal process is an untrusted process (e.g., a process running in the untrusted environment that includes the untrusted application on the untrusted portion of App Server 104 and Client 102). In contrast, in the description of FIGS. 8A-8E, an external process is a trusted process (e.g., a process running in the trusted environment that includes the trusted portion of App Server 104 or and Data Server 106). Untrusted processes are also sometimes referred to as "sandboxed processes."

One of the internal processes prepares (802) to request performance of a first interaction with a first data item stored in a database by an external process of one or more external (e.g., trusted/non-sandboxed) processes. In some embodiments, the first interaction is (804) selected from the set consisting of: a read interaction, a write interaction and a delete interaction. In some embodiments, the computer system includes (806) one or more internal processes and one or more external processes. In some of these embodiments, the one or more internal processes are (808) limited-privilege processes (e.g., sandboxed/untrusted) that operate using a restricted set of privileges and the one or more external processes are (810) expanded-privilege processes (e.g., non-sandboxed/trusted) that operate using an expanded set of privileges including the privileges in the restricted set of privileges and one or more additional privileges.

The preparing includes determining (812) whether the first interaction meets a first trigger condition. In some implementations, determining whether the first interaction meets a first trigger condition includes comparing (814) the first interaction to a plurality of different trigger conditions including the first trigger condition. It should be understood that this comparing step may happen for multiple different interactions with data items in the database. In some implementations, the comparing happens for each interaction with a data item in the database. In other words, when a data item interaction is requested, an internal process determines whether or not the interaction corresponds to a type of interaction that has been identified as triggering another operation. In some embodiments, the determining is performed (816) by one or more of the internal processes using untrusted code (e.g., an untrusted application provided by a third-party application developer).

In some embodiments, in accordance with a determination that the first interaction does not meet (818) the first trigger condition, one of the internal processes sends (820) a first request to an external process to perform the first interaction with the first data item without sending a request to store a marker corresponding to the data item interaction. In contrast, in accordance with a determination that the first interaction meets (821) the first trigger condition, one of the internal processes generates (822) a first marker that includes information identifying the first data item (e.g., a key for the first data item) and sends (824) a first request to an external process to perform the first interaction with the first data item and store the first marker in the database. In some embodiments, the sending is performed (826) by one or more of the external processes using trusted code.

In some embodiments various ones of operations 830-872 are performed (828) after sending the first request. In some embodiments, after sending the first request and before sending the second request, one of the internal processes sends, (830) to an external process of the plurality of external processes, one or more unrelated requests to store and/or access information stored in the database. In other words, the first marker is stored synchronously with the first request and determining whether any operations associated with the marker are to be performed occurs asynchronously with respect to the first request. Thus, if the determining whether the operations associated with markers are to be performed or performing the operations is a computationally-intensive or time consuming task, completing this task does not delay the process of updating the database and inserting markers indicating changes that have been made to the data items in the database.

After sending the first request, one of the internal processes sends (832) a second request to an external process of the plurality of external processes for markers stored in the database. In some embodiments, a plurality of the markers comprise respective key/value pairs and the second request is a request for marker keys. In some other embodiments, the second request has a first stage where markers keys are retrieved and a second stage where the retrieved marker keys are used to retrieve marker values for the markers. In other embodiments only the marker keys are retrieved, as information enabling the data items associated with the markers is present in the marker keys (e.g., the marker keys include information from which a key and kind of its parent entities can be determined). It should be understood that at least some of the keys may not include a value but rather may store all of the relevant information about the marker in the key associated with the marker.

One of the internal processes receives (834), in response to the second request, a plurality of markers corresponding to a plurality of data items stored in the database, including the first marker and determines (836), for each data item in the plurality of data items, whether an operation corresponding to the data item is to be executed. In some implementations, the determining is performed (838) by one or more of the internal processes using untrusted code (e.g., an untrusted application).

In some embodiments, determining whether an operation corresponding to the first data item is to be executed includes accessing (840) the first marker corresponding to the first data item (e.g., retrieving a value that includes content of the first maker using a marker key for the first marker). In some other embodiments, the existence of the first marker in the database indicates (842) that an operation corresponding to the first data item is to be executed. (e.g., the existence of the first marker indicates that the first trigger condition has been met), and thus the internal processes do not need to retrieve a value that includes content of the first marker. The first marker, optionally, includes (844) information indicating that that an operation corresponding to the first data item is to be executed (e.g., the first marker includes an identifier for a handler or other data indicating that the first trigger condition has been met). In some implementations, the information indicating that an operation corresponding to the first data item is to be executed includes (846) information enabling identification of a handler (e.g., the marker includes an identifier of a handler or a record of an interaction with a data item that corresponds to a particular handler), where the first operation is determined using the handler. For example, the identified handler takes the marker as an input, optionally retrieves additional data items from the database and generates operations based on the marker and, in some circumstances, the additional data.

In some embodiments, the information indicating that an operation corresponding to the first data item is to be executed includes information enabling identification of a plurality of handlers and the first operation is determined using a first handler. In some of these embodiments, in accordance with a determination that a second operation corresponding to the first data item is to be executed, one of the internal processes sends (848) a fourth request to an external process of the plurality of external processes to execute the second operation, where the second operation is determined using a second handler. In other words, a single marker can be used to trigger two different operations that are performed on data items using two different handlers. For example, when the marker indicates that a user's status has been updated at a particular time, a first handler updates a time of last user status update for the user whose status has been updated, while a second handler automatically creates a message to send to another user indicating that the user's status has been updated recently.

In some embodiments, determining whether an operation corresponding to a respective data item is to be executed includes identifying (850) a respective operation to be performed based on a respective marker corresponding to the respective data item and determining (852) whether the respective operation has previously been performed for the respective data item. In accordance with a determination that the respective operation has (854) been previously performed for the respective data item, one of the internal processes forgoes (856) performance of the respective operation. However, in accordance with a determination that the respective operation has not (858) been previously performed for the respective data item, one of the internal processes determines (860) that the respective operation is to be performed for the respective data item. In other words, the internal processes may include a mechanism for determining that an operation corresponding to a data trigger has already been executed and preventing duplicate operations from being executed, thereby preventing computing resources from being wasted by re-executing operations that have already been executed.

In accordance with a determination that a first operation corresponding to the first data item is not (862) to be executed, the process ends. However, in accordance with a determination that a first operation corresponding to the first data item is (864) to be executed, one of the internal processes requests (866) execution of the first operation. In some embodiments, the execution is performed (868) by one or more of the external processes using trusted code. The external processes may also determine whether the operation is safe to perform and may refuse to perform (e.g., terminate) the operation if it is determined to be an unsafe operation (e.g., because it will maliciously or unintentionally overwhelm resources at Data Server 106).

In some embodiments, requesting execution of the first operation includes sending (876) a third request to an external process of the plurality of external processes. In some embodiments, requesting execution of the first operation includes sending (878) a request to another computer system (e.g., another computer system in the untrusted environment) to perform the first operation. In some embodiments, in conjunction with requesting execution of the first operation, one of the internal processes requests (880) deletion of the marker.

In some situations, an operation triggered by the markers is an operation to be performed outside of the trusted environment (e.g., an operation that does not affect data stored at Data Server 106 and thus can be performed by the internal processes in the untrusted environment), and the untrusted application performs the operation, or instructs another computer system in the untrusted environment to perform the operation. Thus, in these situations, once the operation triggered by the markers is performed, instructions are sent to an external process in the trusted environment to delete one or more of the markers (e.g., so as to indicate that the operations triggered by the markers have been performed). Alternatively, in some situations the operation is an operation to be executed within the trusted environment (e.g., an operation that affects data stored at Data Server 106 and thus is to be processed by external processes in the trusted environment), and the untrusted application transmits a request to Data Server 106 to execute the operation in addition to deleting the markers. Thus, in these situations, the third request includes instructions to delete the markers corresponding to the triggered operation and to perform the triggered operation. In other words, the first operation includes multiple sub-operations to be performed as part of an atomic transaction (e.g., a request to delete markers corresponding to the triggered operation and a request to perform the triggered operation).

In some embodiments, determining whether an operation corresponding to the first data item is to be performed includes: retrieving (870) one or more input data items from the database in accordance with the first marker and performing (872), at one of the internal processes, an internal operation using the one or more input data items as input to produce one or more output data items. In some of these embodiments, sending the third request to an external process of the plurality of external processes to execute the first operation includes sending (874) the one or more output data items to the database for storage. For example, when a user's status has been changed, an internal process retrieves the marker indicating that the user's status has been changed and a data item that represents the number of changes to the user's status in a predefined time period, An internal process then modifies the data item that represents the number of changes to the user's status in a predefined time period to reflect the number of additional changes that have been made to the user's status since the last time that the marker handler was run (e.g. increasing the count of a "status update" counter from 5 to 7, as shown in FIGS. 5G-5H above) and sends the modified data item back to the external processes to be stored in the database storing the data items.

As described above, in some embodiments the determining steps are performed by one or more of the internal processes using untrusted code (e.g., code that has been not been verified to be free of malicious and/or unstable programming) and storing the first marker in the entity database and performing the first operation are to be performed by one or more of the external processes using trusted code (e.g., code that has been verified to be free of malicious and/or unstable programming). Consequently, the internal processes can run untrusted code, because the untrusted code is confined to the application sandbox. Performing all of the determining operations (e.g., the operations related to triggers that were performed in response to interactions with data items) at the internal processes enables untrusted applications from third-party developers to run arbitrary untrusted code within the internal processes. Consequently, third-party developers are provided with the flexibility to define data triggers to accommodate the needs of their application without endangering the stability or security of external processes running in the trusted environment, such as the processes running on Data Server 106.

It should be understood that the particular order in which the operations in FIGS. 8A-8E have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 600 and 700 (described herein with respect to FIGS. 6A-6B and 7A-7E, respectively) are also applicable in an analogous manner to method 800 described above with respect to FIGS. 8A-8E. For example, the markers, data items, data structures (databases and indexes) and operations described above with reference to method 800 may have one or more of the characteristics of the various markers, data items, data structures (databases and indexes) and operations described herein with reference to methods 600 and 700. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method performed by one or more internal processes running on a computer system having one or more processors and memory comprising:
   receiving, from a first external process of one or more external processes, a first request to interact with a first data item stored in a database;
   in response to the first request:
      performing a first interaction with the first data item in accordance with the first request;
      storing, at a location in the database that is associated with the first data item, a first marker indicative of the first interaction with the first data item; and
      storing a reference to the first marker in an index, wherein the index comprises a plurality of references, each respective reference in the plurality of references corresponding to a particular marker; and
   after storing the first marker:
      identifying, in the database, a plurality of markers corresponding to a plurality of data items stored in the database, the plurality of markers including the first marker, wherein identifying the plurality of markers includes retrieving, via the index, information with respect to the plurality of markers;
      retrieving, from the database, information corresponding to the plurality of markers that enables a determination, for each data item in the plurality of data items, as to whether an operation corresponding to the data item is to be executed; and
      in conjunction with execution of a first operation corresponding to the first data item, deleting the first marker, wherein execution of the first operation includes modifying one or more additional data items associated with the first data item.

2. The method of claim 1, wherein a determination that the first operation is to be executed is made by one of the external processes.

3. The method of claim 1, wherein a determination that the first operation is to be executed is made by one of the internal processes.

4. The method of claim 1, wherein:
   the performing and storing occur synchronously with the first request; and
   the identifying, retrieving and executing occur asynchronously with respect to the first request.

5. The method of claim 1, wherein the data items are stored in a tree-like data structure and a respective marker for a respective data item is stored as a child of the respective data item.

6. The method of claim 1, wherein:
   the first data item comprises a key/value pair;
   the first marker comprises a key; and
   the key of the first marker contains information from which the key of the first data item can be determined.

7. The method of claim 6, wherein:
   the first operation is based on the first data item and the first marker;
   the first data item is retrieved using the key for the first data item; and
   the key for the first data item is determined in accordance with information contained within the key of the first marker.

8. The method of claim 6, wherein the key for the first marker includes information about the nature of the first interaction with the first data item.

9. The method of claim 1, wherein the first operation is executed by a respective internal process of the one or more of the internal processes and executing the first operation includes:
   transmitting, to a respective external process of the one or more external processes, information corresponding to the plurality of markers;
   receiving from the respective external process a request to execute one or more operations, including the first operation; and
   in response to the request to execute the one or more operations:
      executing the one or more operations; and
      deleting the plurality of markers.

10. The method of claim 1, wherein:
    a plurality of the data items in the database have keys that uniquely identify the data items and metadata that identifies a kind of each of the plurality of data items;
    each marker is a respective data item associated with metadata indicating that the respective data item is of a first kind;
    data items in the database are indexed in one or more indexes including a respective index that is sorted in accordance with keys and kinds; and
    identifying markers for a plurality of stored data items includes identifying, in the respective index, a plurality of adjacent index entries that correspond to data items of the first kind.

11. The method of claim 1, wherein the first operation is executed by a respective internal process of the one or more of the internal processes and the first marker is deleted after executing the first operation.

12. The method of claim 11, wherein executing the first operation and deleting the first marker are processed as part of a single transaction.

13. The method of claim 1, wherein the first request includes a copy of the first marker and a request to add the first marker for the first data item to the database.

14. The method of claim 1, wherein the first request does not include any request to add or modify a marker for the first data item, and an internal process adds or modifies a marker for the first data item without input from any of the one or more external processes.

15. The method of claim 1, wherein the first operation is executed by a respective internal process of the one or more of the internal processes and the method further comprises, after receiving the first request and prior to executing the first operation:
  receiving, from a respective external process, a second request to interact with the first data item stored in the database; and
  in response to the second request:
    performing a second interaction with the first data item in accordance with the second request; and
    storing, at a location in the database that is associated with the first data item, a second marker indicative of the second interaction with the first data item in addition to the first marker.

16. The method of claim 1, further comprising, after storing the first marker:
  receiving, from a respective external process, a second request to interact with the first data item stored in the database; and
  in response to the second request:
    performing a second interaction with the first data item in accordance with the second request; and
    in accordance with a determination that no markers associated with the first data item are stored in the database, storing, at a location in the database associated with the first data item, a second marker indicative of the second interaction with the first data item; and
    in accordance with a determination that the first marker is stored at a location in the database that is associated with the first data item, updating the first marker with aggregate information about the first interaction and the second interaction with the first data item.

17. The method of claim 1, further comprising, after receiving the first request:
  receiving, from a respective external process, a second request to interact with the first data item stored in the database; and
  in response to the second request:
    performing a second interaction with the first data item in accordance with the second request; and
    in accordance with a determination that no markers associated with the first data item are stored in the database, storing, at a location in the database associated with the first data item, a second marker indicative of the second interaction with the first data item; and
    in accordance with a determination that the first marker is stored at a location in the database that is associated with the first data item, foregoing storage, in the database, of a second marker indicative of the second interaction with the first data item.

18. The method of claim 1, wherein the one or more external processes comprise an untrusted application and are restricted from performing interactions within the database.

19. A server system, comprising:
  one or more processors;
  memory; and
  one or more programs, wherein the one or more programs are stored in the memory and configured to be executed by the one or more processors, the one or more programs including instructions for:
    receiving, from a first external process of one or more external processes, a first request to interact with a first data item stored in a database;
    in response to the first request:
      performing a first interaction with the first data item in accordance with the first request; and
      storing, at a location in the database that is associated with the first data item, a first marker indicative of the first interaction with the first data item; and
      storing a reference to the first marker in an index, wherein the index comprises a plurality of references, each respective reference in the plurality of references corresponding to a particular marker; and
    after storing the first marker:
      identifying, in the database, a plurality of markers corresponding to a plurality of data items stored in the database, the plurality of markers including the first marker, wherein identifying the plurality of markers includes retrieving, via the index, information with respect to the plurality of markers;
      retrieving, from the database, information corresponding to the plurality of markers that enables a determination, for each data item in the plurality of data items, as to whether an operation corresponding to the data item is to be executed; and
      in conjunction with execution of a first operation corresponding to the first data item, deleting the first marker, wherein execution of the first operation includes modifying one or more additional data items associated with the first data item.

20. The system of claim 19, wherein:
  the first data item comprises a key/value pair;
  the first marker comprises a key; and
  the key of the first marker contains information from which the key of the first data item can be determined.

21. The system of claim 20, wherein:
  the first operation is based on the first data item and the first marker;
  the first data item is retrieved using the key for the first data item; and
  the key for the first data item is determined in accordance with information contained within the key of the first marker.

22. The system of claim 19, wherein:
  a plurality of the data items in the database have keys that uniquely identify the data items and metadata that identifies a kind of each of the plurality of data items;
  each marker is a respective data item associated with metadata indicating that the respective data item is of a first kind;
  data items in the database are indexed in one or more indexes including a respective index that is sorted in accordance with keys and kinds; and
  identifying markers for a plurality of stored data items includes identifying, in the respective index, a plurality of adjacent index entries that correspond to data items of the first kind.

23. The system of claim 19, wherein the one or more external processes comprise an untrusted application and are restricted from performing interactions within the database.

24. A non-transitory computer readable storage medium storing one or more programs, the one or more programs comprising instructions, which when executed by a computer system with one or more processors, cause the computer system to:
  receive, from a first external process of one or more external processes, a first request to interact with a first data item stored in a database;
  in response to the first request:
    perform a first interaction with the first data item in accordance with the first request; and store, at a location in the database that is associated with the first data item, a first marker indicative of the first interaction with the first data item; and store a reference to the first marker in an index, wherein the index comprises a plurality of references, each respective reference in the plurality of references corresponding to a particular marker; and after storing the first marker:

identify, in the database, a plurality of markers corresponding to a plurality of data items stored in the database, the plurality of markers including the first marker, wherein identifying the plurality of markers includes retrieving, via the index, information with respect to the plurality of markers;

retrieve, from the database, information corresponding to the plurality of markers that enables a determination, for each data item in the plurality of data items, as to whether an operation corresponding to the data item is to be executed; and in conjunction with execution of a first operation corresponding to the first data item, delete the first marker, wherein execution of the first operation includes modifying one or more additional data items associated with the first data item.

25. The non-transitory computer readable storage medium of claim 24, wherein:

the first data item comprises a key/value pair;

the first marker comprises a key; and the key of the first marker contains information from which the key of the first data item can be determined.

26. The non-transitory computer readable storage medium of claim 25, wherein:

the first operation is based on the first data item and the first marker;

the first data item is retrieved using the key for the first data item; and the key for the first data item is determined in accordance with information contained within the key of the first marker.

27. The non-transitory computer readable storage medium of claim 24, wherein:

a plurality of the data items in the database have keys that uniquely identify the data items and metadata that identifies a kind of each of the plurality of data items;

each marker is a respective data item associated with metadata indicating that the respective data item is of a first kind;

data items in the database are indexed in one or more indexes including a respective index that is sorted in accordance with keys and kinds; and identifying markers for a plurality of stored data items includes identifying, in the respective index, a plurality of adjacent index entries that correspond to data items of the first kind.

28. The non-transitory computer readable storage medium of claim 24, wherein the one or more external processes comprise an untrusted application and are restricted from performing interactions within the database.

* * * * *